US012329994B2

(12) United States Patent
Walker et al.

(10) Patent No.: US 12,329,994 B2
(45) Date of Patent: *Jun. 17, 2025

(54) RESPIRATOR FLOW CONTROL APPARATUS AND METHOD

(71) Applicant: 3M INNOVATIVE PROPERTIES COMPANY, St. Paul, MN (US)

(72) Inventors: Garry J. Walker, Norton (GB); Andrew Murphy, Binchester Moor (GB); Desmond T. Curran, Nevilles Cross (GB); Derek A. Parkin, Newton Aycliffe (GB); Thomas I. Insley, Lake Elmo, MN (US); Mark A. J. Fernandes, Leamington Spa (GB)

(73) Assignee: 3M Innovative Properties Company, St. Paul, MN (US)

( * ) Notice: Subject to any disclaimer, the term of this patent is extended or adjusted under 35 U.S.C. 154(b) by 930 days.

This patent is subject to a terminal disclaimer.

(21) Appl. No.: 17/446,466

(22) Filed: Aug. 31, 2021

(65) Prior Publication Data

US 2021/0387028 A1 Dec. 16, 2021

Related U.S. Application Data

(63) Continuation of application No. 16/167,955, filed on Oct. 23, 2018, now Pat. No. 11,130,008, which is a (Continued)

(51) Int. Cl.
*A62B 18/04* (2006.01)
*A42B 3/28* (2006.01)
(Continued)

(52) U.S. Cl.
CPC .............. *A62B 18/04* (2013.01); *A42B 3/286* (2013.01); *A62B 17/04* (2013.01); *A62B 18/006* (2013.01); *A62B 18/084* (2013.01); *A62B 18/10* (2013.01)

(58) Field of Classification Search
CPC ................ A41D 13/0025; A41D 13/11; A41D 13/1153; A41D 13/1184; A41D 13/1218;
(Continued)

(56) References Cited

U.S. PATENT DOCUMENTS

| | | |
|---|---|---|
| 1,917,961 A | 7/1933 | Fee |
| 2,048,059 A | 7/1936 | Giraudet de Boudemange |

(Continued)

FOREIGN PATENT DOCUMENTS

| | | |
|---|---|---|
| DE | 624224 | 8/1936 |
| DE | 3139198 | 3/1983 |

(Continued)

OTHER PUBLICATIONS

Interior picture of Speedglass Helmet (applicants were in possession of the products shown in the pictures prior to the filing date).

(Continued)

*Primary Examiner* — Annette Dixon

(57) ABSTRACT

A respirator has a shell that defines a breathable air zone for a user wearing the respirator. An air flow control system for the respirator has an air delivery conduit within the shell of the respirator, a valve member moveable relative to the air delivery conduit and within the shell to vary the amount of air flow through the air delivery conduit, and a valve actuator outside of the shell of the respirator. The valve actuator is manipulatable by a user of the respirator while wearing the respirator to control movement of the valve member.

11 Claims, 19 Drawing Sheets

Related U.S. Application Data continuation of application No. 14/556,692, filed on Dec. 1, 2014, now Pat. No. 10,137,320, which is a continuation of application No. 12/529,794, filed as application No. PCT/US2008/057788 on Mar. 21, 2008, now abandoned.

(60) Provisional application No. 61/066,129, filed on Mar. 23, 2007.

(51) Int. Cl.
*A62B 17/04* (2006.01)
*A62B 18/00* (2006.01)
*A62B 18/08* (2006.01)
*A62B 18/10* (2006.01)

(58) Field of Classification Search
CPC ......... A42B 1/046; A42B 3/286; A61F 9/029; A61F 9/068; A61M 16/06; A61M 16/0627; A62B 15/00; A62B 17/006; A62B 17/04; A62B 18/04; A62B 18/045; B64D 2231/025; Y10S 128/91
See application file for complete search history.

(56) References Cited

U.S. PATENT DOCUMENTS

| | | | | | |
|---|---|---|---|---|---|
| 2,896,617 | A | * | 7/1959 | Gibbons | A61F 9/068 128/200.27 |
| 3,223,086 | A | | 6/1960 | Denton | |
| 3,529,594 | A | * | 9/1970 | Charnley | A62B 17/006 2/457 |
| 3,601,219 | A | | 8/1971 | Raschke | |
| 3,739,774 | A | | 6/1973 | Gregory | |
| 3,777,750 | A | | 12/1973 | Savornin | |
| 3,955,570 | A | | 5/1976 | Hutter | |
| 3,961,626 | A | | 6/1976 | Houchen | |
| 3,963,021 | A | | 6/1976 | Bancroft | |
| 3,990,112 | A | * | 11/1976 | Ciffolillo | A41D 13/11 2/205 |
| 4,052,984 | A | | 10/1977 | Brockway | |
| 4,055,173 | A | | 10/1977 | Knab | |
| 4,116,237 | A | | 9/1978 | Birch | |
| 4,127,130 | A | | 11/1978 | Naysmith | |
| 4,172,294 | A | | 10/1979 | Harris | |
| 4,236,514 | A | | 12/1980 | Moretti | |
| 4,280,491 | A | | 7/1981 | Berg | |
| 4,403,608 | A | | 9/1983 | Warncke | |
| 4,407,280 | A | * | 10/1983 | Trammell | A61M 16/0627 128/205.26 |
| 4,411,264 | A | | 10/1983 | Jacobson | |
| 4,484,575 | A | | 11/1984 | Brockway et al. | |
| 4,508,115 | A | | 4/1985 | Warncke | |
| 4,571,741 | A | | 2/1986 | Guillaumot | |
| 4,619,254 | A | | 10/1986 | Moretti et al. | |
| 4,626,122 | A | | 12/1986 | Harrison et al. | |
| 4,671,321 | A | | 6/1987 | Paetzel | |
| 4,683,880 | A | * | 8/1987 | Werjefelt | A62B 15/00 128/201.28 |
| 4,815,458 | A | | 3/1989 | Sing | |
| 4,899,740 | A | | 2/1990 | Napolitano | |
| 4,964,178 | A | | 10/1990 | Giancarlo et al. | |
| 5,003,974 | A | | 4/1991 | Mou | |
| 5,027,807 | A | | 7/1991 | Wise et al. | |
| 5,054,480 | A | * | 10/1991 | Bare | A62B 18/045 128/206.28 |
| 5,123,114 | A | | 6/1992 | Desanti | |
| 5,283,914 | A | | 2/1994 | James | |
| H1316 | H | | 6/1994 | McGuiness | |
| 5,533,500 | A | | 7/1996 | Her-Mou | |
| 5,577,495 | A | | 11/1996 | Murphy | |
| 5,592,936 | A | | 1/1997 | Thomas, Jr. et al. | |
| 5,690,095 | A | | 11/1997 | Glynn et al. | |
| 5,734,994 | A | | 4/1998 | Rogers | |
| 5,758,639 | A | | 6/1998 | Ikonen | |
| 5,819,728 | A | | 10/1998 | Ritchie | |
| 5,878,742 | A | | 3/1999 | Figueredo et al. | |
| 6,014,971 | A | | 1/2000 | Danisch et al. | |
| 6,016,802 | A | | 1/2000 | Jackson | |
| 6,032,291 | A | | 3/2000 | Asenguah et al. | |
| 6,055,666 | A | | 5/2000 | Eklund et al. | |
| 6,102,034 | A | | 8/2000 | Buhlmann | |
| 6,240,567 | B1 | | 6/2001 | Johnston | |
| 6,279,573 | B1 | | 8/2001 | Johnson et al. | |
| 6,374,823 | B1 | | 4/2002 | Hajianpour | |
| 6,393,617 | B1 | | 5/2002 | Paris | |
| 6,615,828 | B1 | | 9/2003 | Petherbridge | |
| 6,619,286 | B2 | | 9/2003 | Patel | |
| 6,834,646 | B2 | | 12/2004 | Alon et al. | |
| 6,837,239 | B2 | | 1/2005 | Beizndtsson et al. | |
| 6,973,677 | B2 | | 12/2005 | Diaz et al. | |
| 6,990,691 | B2 | | 1/2006 | Klotz | |
| 7,051,732 | B2 | | 5/2006 | Uusitalo et al. | |
| 7,104,264 | B2 | | 9/2006 | Lee et al. | |
| 7,156,093 | B2 | | 1/2007 | King | |
| 7,735,156 | B2 | | 6/2010 | VanDerWoude | |
| 7,841,026 | B2 | | 11/2010 | Makris | |
| 8,127,375 | B2 | | 3/2012 | Pierce | |
| 8,282,234 | B2 | | 10/2012 | VanDerWoude | |
| 8,936,022 | B2 | * | 1/2015 | Walker | A62B 17/04 128/206.28 |
| 9,868,001 | B2 | * | 1/2018 | Walker | A62B 18/02 |
| 10,137,320 | B2 | * | 11/2018 | Walker | A62B 18/084 |
| 11,130,008 | B2 | * | 9/2021 | Walker | A62B 17/04 |
| 2003/0066121 | A1 | | 4/2003 | Diaz et al. | |
| 2003/0111074 | A1 | | 6/2003 | Alon et al. | |
| 2004/0003810 | A1 | | 1/2004 | Templeton et al. | |
| 2004/0055601 | A1 | | 3/2004 | De Luca et al. | |
| 2004/0144382 | A1 | | 7/2004 | Alvey et al. | |
| 2004/0187195 | A1 | | 9/2004 | Wang Lee | |
| 2004/0188743 | A1 | | 9/2004 | Li et al. | |
| 2005/0010992 | A1 | | 1/2005 | Klotz et al. | |
| 2005/0022817 | A1 | | 2/2005 | Alvey | |
| 2005/0061317 | A1 | | 3/2005 | King | |
| 2005/0098181 | A1 | * | 5/2005 | Trammell | A61M 16/06 128/205.26 |
| 2005/0199235 | A1 | | 9/2005 | Borsari | |
| 2006/0048777 | A1 | | 3/2006 | Brookman | |
| 2006/0048782 | A1 | | 3/2006 | Gossweiler | |
| 2006/0101557 | A1 | | 5/2006 | Klotz | |
| 2006/0137686 | A1 | | 6/2006 | Macris | |
| 2010/0108067 | A1 | | 5/2010 | Walker | |
| 2011/0265790 | A1 | * | 11/2011 | Walker | A42B 3/286 128/201.23 |

FOREIGN PATENT DOCUMENTS

| | | |
|---|---|---|
| EP | 027521 | 7/1983 |
| EP | 0325959 | 8/1989 |
| EP | 0 602 847 | 12/1993 |
| EP | 0528733 | 9/1996 |
| EP | 0838237 | 4/1998 |
| EP | 127941 | 1/2003 |
| FR | 1102541 | 10/1955 |
| GB | 2160108 | 12/1985 |
| GB | 2264646 | 9/1993 |
| GB | 2338400 | 12/1999 |
| GB | 2430159 | 3/2007 |
| JP | 18-1830 | 2/1943 |
| JP | 47-035838 | 9/1972 |
| JP | 48-019998 | 6/1973 |
| JP | 59-030250 | 2/1984 |
| JP | 59-41435 | 3/1984 |
| JP | 63-131726 | 8/1988 |
| JP | 63-180058 | 11/1988 |
| JP | 4-65556 U | 10/1990 |
| JP | 11-208261 | 8/1999 |
| JP | 11-290472 | 10/1999 |
| JP | 2002-348720 | 12/2002 |
| JP | 2003-49317 | 2/2003 |
| JP | 2003-119611 | 4/2003 |
| JP | 2003-336120 | 11/2003 |
| JP | 2004-156151 | 6/2004 |

(56) References Cited

FOREIGN PATENT DOCUMENTS

| | | |
|---|---|---|
| JP | 2004-270087 | 9/2004 |
| JP | 43-52448 | 8/2009 |
| JP | 45-14909 | 5/2010 |
| KR | 2002-0011308 | 2/2002 |
| KR | 20-0415425 | 5/2006 |
| KR | 20-0415988 | 5/2006 |
| WO | WO 94/03235 | 2/1994 |
| WO | WO 96/40370 | 12/1996 |
| WO | WO 99/24742 | 11/1997 |
| WO | WO 98/54991 | 12/1998 |
| WO | WO 01/44126 | 12/2000 |
| WO | WO 01/52675 | 7/2001 |
| WO | WO 02/13884 | 2/2002 |
| WO | WO 2006/006819 | 1/2006 |
| WO | WO 2006/102545 | 9/2006 |
| WO | WO 2007/011646 | 1/2007 |
| WO | WO 2007/028877 | 3/2007 |
| WO | WO 2008/118770 | 10/2008 |

OTHER PUBLICATIONS

Picture of Albatross Helmet (applicants were in possession of the products shown in the pictures prior to the filing date).

Interior picture of Optrel Helmet (applicants were in possession of the products shown in the pictures prior to the filing date).

Solar-Powered Cooling Pith Helmet from Hammacher Schlemmer, obtained from internet on Jan. 22, 2007, http://www.hammacher.com/publish/72808.asp?source=google.

* cited by examiner

RESPIRATOR FLOW CONTROL APPARATUS AND METHOD

BACKGROUND

Generally, this disclosure relates to respirators that are worn on a user's head to provide breathable air for the user.

Respirators are well known and have many uses. For example, respirators may be used to allow the user to breathe safely in a contaminated atmosphere, such as a smoke filled atmosphere, a fire or a dust laden atmosphere, or in a mine or at high altitudes where sufficient breathable air is otherwise unavailable, or in a toxic atmosphere, or in a laboratory. Respirators may also be worn where it is desired to protect the user from contaminating the surrounding atmosphere, such as when working in a clean room used to manufacture silicone chips.

Some respirators have a helmet that is intended to provide some protection against impacts when working in a dangerous environment or when the user is at risk of being struck by falling or thrown debris such as in a mine, an industrial setting or on a construction site. Another type of respirator employs a hood when head protection from impact is not believed to be required such as, for example, when working in a laboratory or a clean room.

A respirator hood is usually made of a soft, flexible material suitable for the environment in which the hood is to be worn, and an apron or skirt may be provided at a lower end of the hood to extend over the shoulder region of the user. Hoods of this type are commonly used with a bodysuit to isolate the user from the environment in which the user is working. The apron or skirt often serves as an interface with the bodysuit to shield the user from ambient atmospheric conditions. Another form of hood is sometimes referred to as a head cover, and does not cover a user's entire head, but only extends above the ears of the user, and extends down about the chin of the user in front of the user's ears. The hood has a transparent region at the front, commonly referred to as a visor, through which the user can see. The visor may be an integral part of the hood or detachable so that it can be removed and replaced if damaged.

A respirator helmet is usually made from a hard, inflexible material suitable for the environment in which the helmet is to be worn. For example, such materials may include metallic materials such as steel or hard polymers. A respirator helmet typically will extend at least over the top of the user's head, and may have a brim around all sides thereof, or a bill extending forwardly therefrom, thereby providing additional protection over the user's facial area. In addition, such a helmet may also include protective sides extending downwardly from along the rear and sides of the user's head. Such sides may be formed from an inflexible material or may be formed from a flexible material. A respirator helmet has a visor disposed thereon that permits the user to see outside of the respirator. The visor may be transparent. However, in some instance, such as for welding, the visor may be tinted or it may include a filter, such as an auto darkening fitter (ADF). The visor may be an integral part of the respirator helmet or detachable so that is can be removed and replaced if damaged.

A respirator helmet is intended to provide a zone of breathable air space for a user. As such, the helmet is also typically sealed about the user's head and/or neck area. At least one air supply provides breathable air to the interior of the respirator helmet. The air supply pipe may be connected to a remote air source separate from the user, but for many applications, the air supply pipe is connected to a portable air source carried by the user, commonly on the user's back or carried on a belt. In one form, a portable air supply comprises a turbo unit, including a fan driven by a motor powered by a battery and a filter. The portable air supply is intended to provide a breathable air supply to the user for a predetermined period of time.

SUMMARY

An air flow control system for a respirator, which has a shell that defines a breathable air zone for a user wearing the respirator, comprises an air delivery conduit within the shell of the respirator, a valve member moveable relative to the air delivery conduit and within the shell to vary the amount of air flow through the air delivery conduit, and a valve actuator outside of the shell of the respirator that is manipulatable by a user of the respirator while wearing the respirator to control movement of the valve member.

In another aspect, a method for controlling air flow within a respirator comprises forcing air through an air delivery conduit within a shell of a respirator, wherein the shell defines a breathable air zone for a user wearing the respirator, and manipulating an actuator outside of and adjacent to the shell, by a user of the respirator while wearing the respirator, to vary the amount of air flow through the air delivery conduit.

In another aspect, a respirator comprises a shell that defines a breathable air zone for a user wearing the respirator, wherein the shell includes a visor portion to permit a user wearing the respirator to see through the visor portion of the shell, a plurality of air delivery conduits within the shell of the respirator, a valve within at least one of the air delivery conduits to vary the amount of air flow therethrough, and a valve actuator for controlling the valve, wherein the valve actuator is outside the shell of the respirator and is capable of manipulation by the user of the respirator while the user is wearing the respirator.

This Summary is provided to introduce a selection of concepts in a simplified form that are further described below in the Detailed Description. This Summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

Glossary

The terms set forth below will have the meanings as defined:

Hood means a loose fitting face piece that covers at least a face of the user but does not provide head impact protection.

Helmet means a head covering that is at least partially formed from a material that provides impact protection for a user's head and includes a face piece that covers at least a face of the user.

Non-shape stable means a characteristic of a structure whereby that structure may assume a shape, but is not necessarily able, by itself, to retain that shape without additional support.

Shape stable means a characteristic of a structure whereby that structure has a defined shape and is able to retain that shape by itself, although it may be flexible.

Breathable air zone means the space around at least a user's nose and mouth where air may be inhaled.

Shell means a barrier that separates an interior of a respirator, including at least the breathable air zone, from the ambient environment of the respirator.

Valve means a device that regulates the flow of air.

Valve actuator means a device responsible for moving a valve member of a valve.

Valve member means an element of a valve that is moveable relative to a manifold.

Manifold means an air flow plenum having an air inlet and having one or discrete air conduits in communication with the air inlet, with each air conduit having at least one air outlet.

Figure 1:
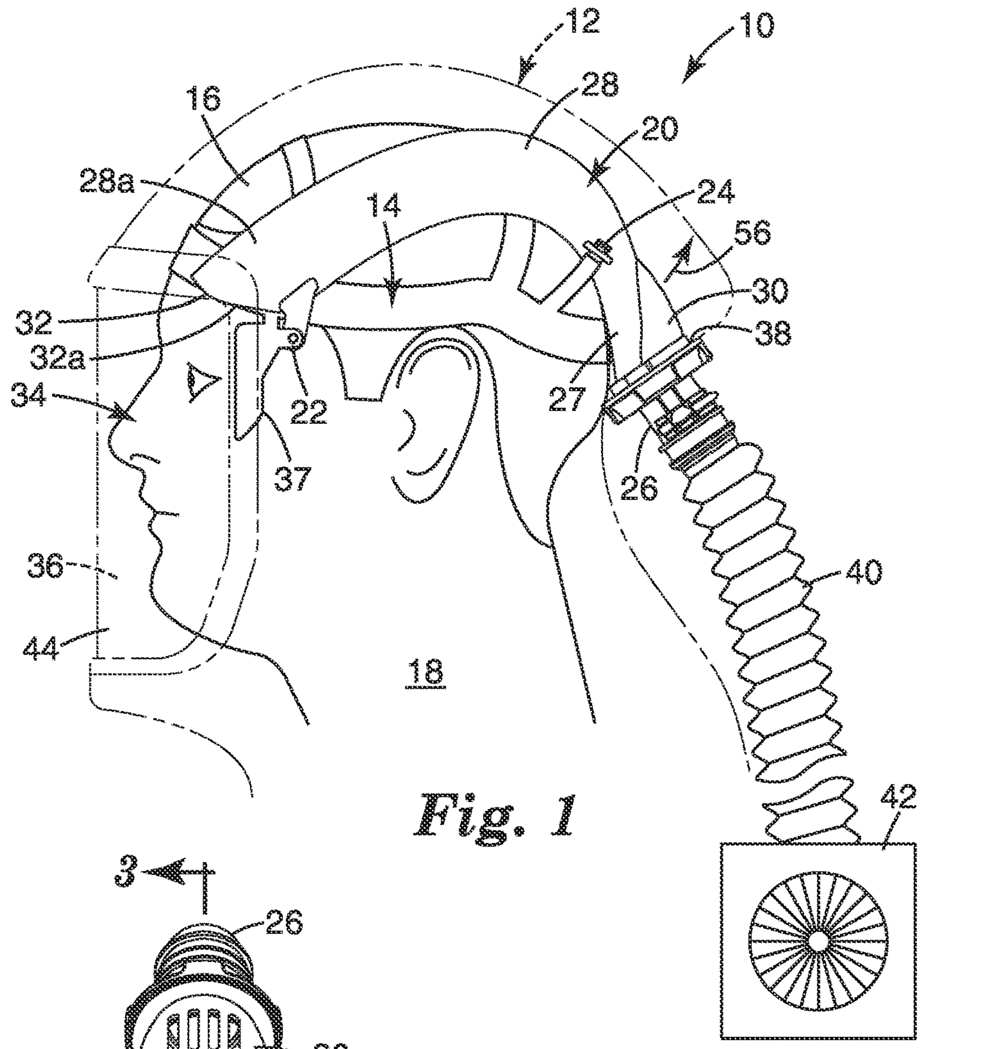
FIG. 1 is a side elevation of a respirator assembly, with a respirator hood shown in phantom.

A respirator assembly 10 is illustrated in FIG. 1. In this instance, the respirator assembly 10 includes a non-shape stable hood 12 that serves as a shell for the respirator assembly 10 and that, for clarity of illustration in FIG. 1, is shown by phantom lines. The respirator assembly 10 further includes a head harness 14 that is adjustable in one or more dimensions so that it may be sized to conform to a head 16 of a user 18. The hood 12 is sized to extend over at least a front and top of the head 16 of the user 18, if not over the entire head 16.

The respirator assembly 10 further comprises a shape stable air manifold 20. The manifold 20 is removably supported by the harness 14 at a plurality of points such as attachment points 22 and 24 in FIG. 1. The harness 14 and manifold 20 are secured together by suitable mechanical fasteners, such as detents, clips, snaps, or two part mechanical fasteners (e.g., hook and loop fasteners). In one embodiment, the harness 14 and manifold 20 are separable via such fasteners. When connected and mounted on a user's head 16 as illustrated in FIG. 1, the harness 14 supports the manifold 20 in a desired position relative to the user's head 16.

Figure 2:
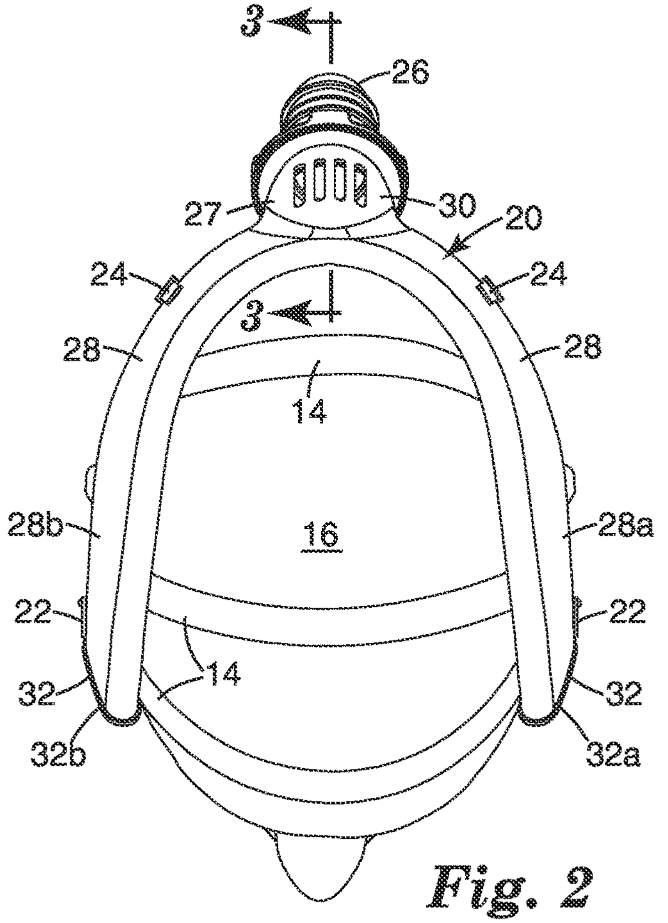
FIG. 2 is a top view of the respirator assembly of FIG. 1, with the hood removed for clarity of illustration.

As seen in FIGS. 1 and 2, the air manifold 20 has an air inlet conduit 26 and a plurality of air delivery conduits 27 and 28 (in FIG. 2, two of the delivery conduits **28*a* and 28*b* are illustrated). In one embodiment, the air inlet conduit 26 is disposed adjacent a back of the user's head 16. The air inlet conduit 26 is in fluid communication with the air delivery conduit 27. The air delivery conduit 27 includes an air distribution chamber 30 and is in turn in fluid communication with each air delivery conduit 28. The air delivery conduit 27 and its air distribution chamber 30 are also disposed adjacent the back of the user's head 16, and as the air delivery conduits 28 extend forwardly therefrom, they curve and split to provide separate conduits for the flow of air therethrough. Each air delivery conduit 28 has an air outlet 32 (e.g., air outlet 32***a* of air delivery conduit 28*a* and air outlet 32*b* of air delivery conduit 28*b*). In one embodiment, each air outlet is adjacent a facial area 34 of the head 16 of the user 18. While only two air delivery conduits 28 are illustrated on the manifold 20 in FIGS. 1 and 2, it is understood that any number (e.g., one, two, three, etc.) of such conduits may be provided. Further, in some embodiments, a manifold may have one or more outlets of respective air delivery conduits adjacent a user's forehead and one or more outlets of respective air delivery conduits adjacent a user's nose and mouth (e.g., on each side of the user's nose and mouth).

The hood 12 includes a visor 36 disposed on a front side thereof through which a user 18 can see. In one embodiment, (see, e.g., FIG. 1), an interior portion of the visor 36 (or an interior portion of the hood) is releasably affixed to a tab portion 37 of the harness 14, on each side of the user's facial area 34. The hood 12 is thus supported adjacent its front side by the harness 14. On its back side, the hood 12 includes an air inlet opening 38 (FIG. 1). The air inlet conduit 26 of the manifold 20 extends through the air inlet opening 38 and is in fluid communication with a supply of breathable air via an air hose 40 attached to the air inlet conduit 26 (that attachment being, as shown in the embodiment of FIG. 1, outside of the hood 12). The hose 40 is in turn connected to a supply 42 of breathable air for the user 18. Such a supply 42 may take the form of a pressurized tank of breathable air, a powered air-purifying respirator (PAPR) or a supplied breathable air source, as is known. The air flows from the supply 42 through hose 40 and into the air inlet conduit 26 of the manifold 20. The air then flows through the air distribution chamber 30 of the air delivery conduit 27 and into each of the air delivery conduits 28. Air flows out of each conduit 28 from its air outlet 32 and into a breathable air zone 44 defined by the hood 12 about the head 16 of the user 18. Breathable air is thus delivered by the manifold 20 to the user's facial area 34 for inhalation purposes which, in some embodiments, includes not only the space around the user's nose and mouth where air may be inhaled, but also other areas about the user's face such as around the user's eyes and forehead.

Because of the introduction of such air, the air pressure within the hood 12 typically may be slightly greater than the air pressure outside the hood. Thus, the hood 12 can expand generally to the shape illustrated in FIG. 1 about the user's head 16, manifold 20 and harness 14. As is typical, air is allowed to escape the hood 12 via exhalation ports (not shown) or via allowed leakage adjacent the lower edges of the hood 12 (e.g., about the neck and/or shoulders of the user 18). The respirator assembly 10 thus provides the user 18 with a breathable zone of air 44 within the non-shape stable hood 12, with the air delivered adjacent the user's face by the shape stable manifold 20.

Figure 3:
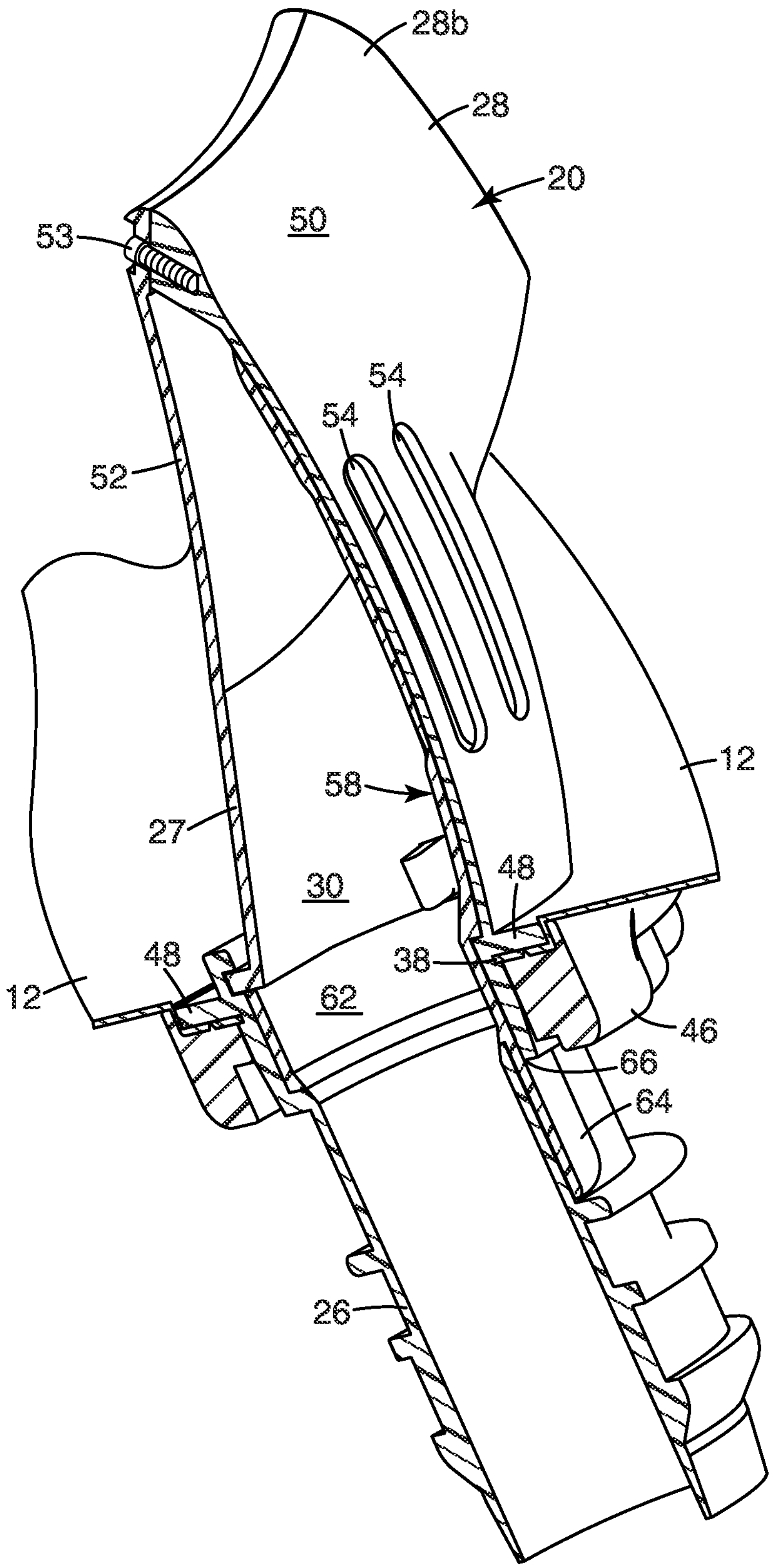
FIG. 3 is an enlarged partial sectional perspective view as taken along lines 3-3 in FIG. 2, with a portion of the hood shown.
Figure 4:
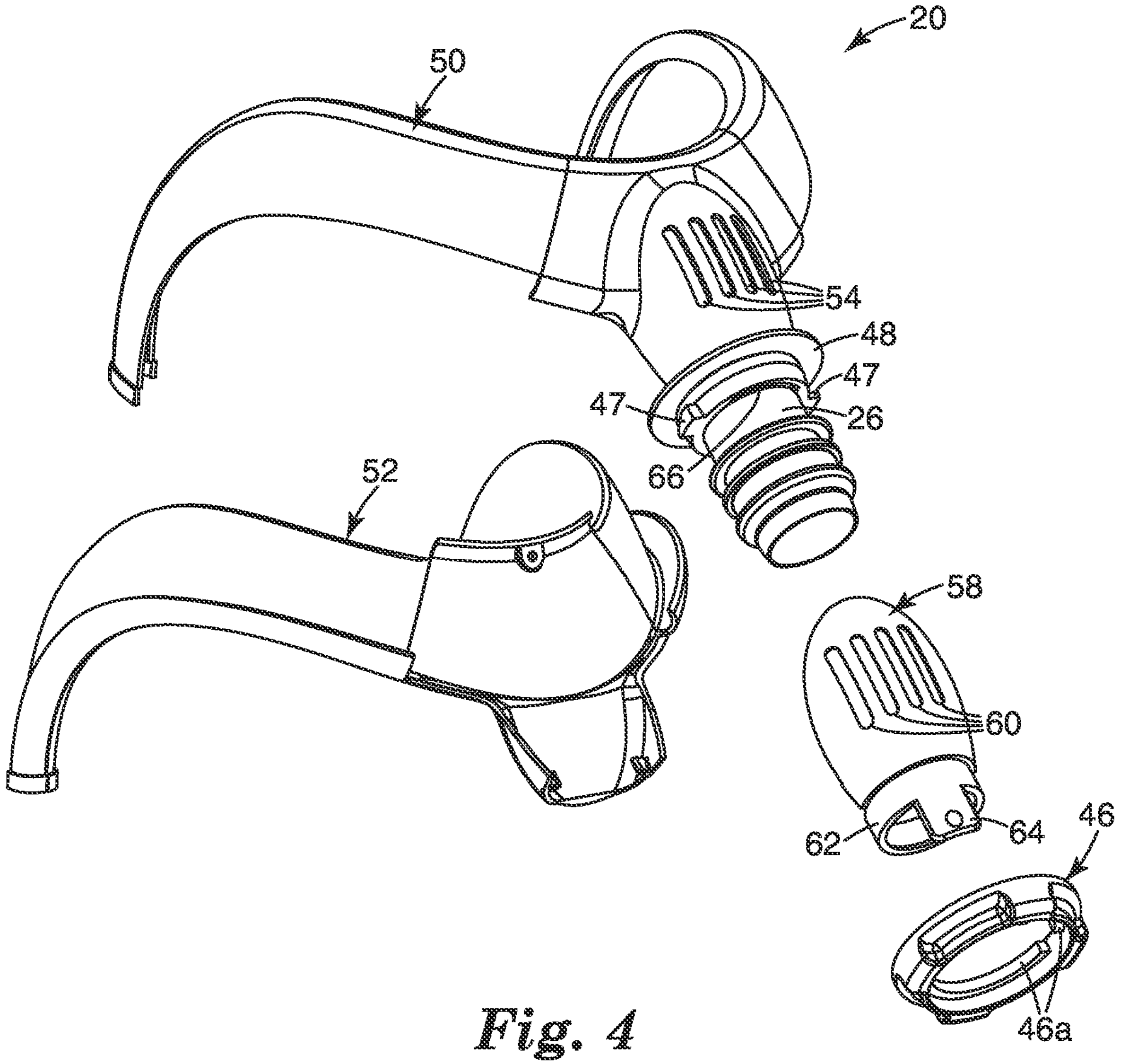
FIG. 4 is an exploded perspective view of the manifold for the respirator assembly.

FIG. 3 illustrates a connection between the hood 12 and the manifold 20 via the air inlet opening 38 of the hood 12. The air inlet conduit 26 extends through the air inlet opening 38. A removable fastener, such as lock ring 46 is received on the air inlet conduit on an external side of the hood 12. As seen in FIG. 4, the lock ring 46 has cammed surfaces 46*a* which engage (upon rotation of the lock ring 46 relative to the air inlet conduit 26) cooperative surfaces 47 on the air inlet conduit 26 to urge the material of the hood adjacent the air inlet opening 38 against an annular shoulder 48 of the air inlet conduit 26 on an interior side of the material of the hood 12. Lock ring 46 and shoulder 48 thus cooperate to form a seal between the hood 12 and manifold 20 as it passes through the air inlet opening 38 of the hood 12.

The lock ring 46 may be coupled to the air inlet conduit by opposed surfaces 46*a* and 47 such as mentioned above, or may be coupled thereto by other suitable means, such as opposed threaded surfaces or a bayonet mount or the like. In each instance, the lock ring 46 is removable, thereby allowing the hood 12 to be removable with respect to the manifold 20 (and harness 14 attached thereto). Thus, the hood 12 may be considered a disposable portion of the respirator assembly 10. Once used, soiled or contaminated by use, the hood 12 may be disconnected (via separation of the hood 12 from the manifold 20 by means of manipulation of the lock ring 46, and by disconnection of the hood 12 from the harness 14, if so attached) and discarded, and a new hood 12 attached to the harness 14 and to the manifold 20 for reuse.

By separating the structure facilitating the air flow within the hood from the hood itself, the hood construction is simplified and less expensive. In addition, no portion of the air flow conduits are formed from non-shape stable material (i.e., from hood material) and thus prone to collapse, which can lead to inconsistent air flow to a user or to inappropriate air flow distribution (such as the air blowing directly into the user's eyes). The shape stable manifold 20 has a defined configuration that does not appreciably change, even though the shape of the hood may be altered by contact with certain objects. Thus, the conduits for air delivery defined by the manifold 20 will not collapse or be redirected inadvertently to provide an undesired direction of air flow into the breathable air zone. Further, the cost of fabricating the harness and manifold assembly will typically be greater than the cost of fabricating the hood alone. Thus, the more expensive components (e.g., harness and manifold) are reusable, while a used hood can be removed therefrom and a new hood can be substituted in its place. Indeed, the reusable manifold 20 may be used with hoods of different configurations, so long as each hood is provided with an air inlet port sized and positioned to sealably mate with the air inlet conduit of the manifold. A hood formed as a portion of a full body suit, a shoulder length hood, a head cover or even hoods of different styles (e.g., different visor shapes or hood shape configurations) can thus be used with the same manifold 20. The hood may be non-shape stable, as discussed above, while the manifold is shape stable, thereby insuring that the air flow to the user will be consistent in volume and consistently delivered to a desired outlet position within the breathable air zone.

FIG. 4 illustrates, in an exploded view, one way for forming the manifold 20. In the illustrative embodiment, the manifold 20 has an upper half 50 and a lower half 52. The upper half includes the air inlet conduit 26 formed thereon. In one embodiment, each half is formed (e.g., molded) from a thermoplastic polymer such as, for example, polypropylene, polyethylene, polythene, nylon/epdm mixture and expanded polyurethane foam. Such materials might incorporate fillers or additives such as pigment, hollow glass microspheres, fibers, etc. The upper and lower halves 50 and 52 are formed to fit or mate together to define the manifold 20, with the space between the upper and lower halves 50 and 52 forming air delivery conduit 27 (see FIGS. 1 and 2), its air distribution chamber 30, and the air delivery conduits 28. Upon assembly, the upper and lower halves 50 and 52 are secured together by a plurality of suitable fasteners such as, for example, a threaded fastener 53 (FIG. 3), or may be mounted together using adhesives, thermal or ultrasonic bonding techniques, or by other suitable fastening arrangements. Once assembled, it is not contemplated that any portion of the manifold be separable from the manifold, other than the lock ring 46.

In one embodiment, the air distribution chamber 30 of the manifold 20 has a plurality of openings 54 therein (in alternative embodiments, no openings out of the manifold within the hood are provided except for the air outlet on each air distribution conduit). As illustrated in FIGS. 3-6, a set of such openings may be provided and in this instance, the openings 54 are formed as generally parallel slots. While four openings 54 are illustrated, any number of openings (including a single opening) will suffice. The openings 54 are aligned so that if air is allowed to flow out of the air distribution chamber 30 through the openings 54, the air flows away from the head of the user (in direction of arrow 56 in FIG. 1). Air flowing out of the openings 54 is still within the shell defined by the hood 12, and is useful for user perceived cooling purposes about the user's head 16.

Figure 6:
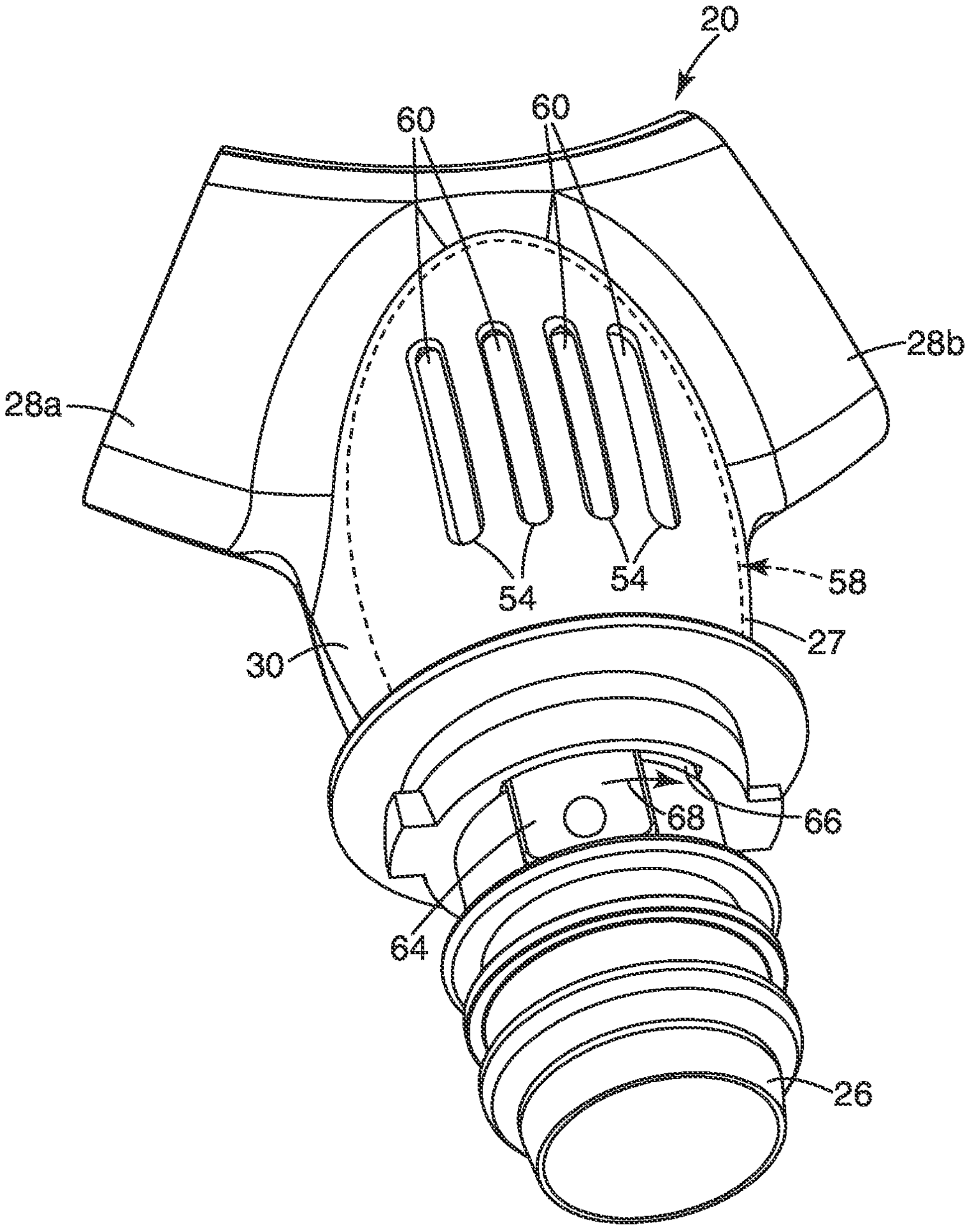
FIG. 6 is a view similar to FIG. 5, showing the valve and actuator in an open position.

A valve comprises a shield plate 58 that is moveable to cover and uncover the openings 54 on the manifold 20. The shield plate 58 is formed, on an exterior surface thereof, to mirror the interior surface of the air distribution chamber 30 on the upper half 50 of the manifold 20. The shield plate 58 likewise has a plurality of openings 60 therethrough, with the same number and shape of openings 60 as the openings 54, and the openings 60 are formed to be selectively aligned with the openings 54 (as seen in FIGS. 3 and 6). The mating of the shield plate 58 and inner surface of the upper half 50 of the manifold 20 is illustrated in FIG. 3.

Figure 5:
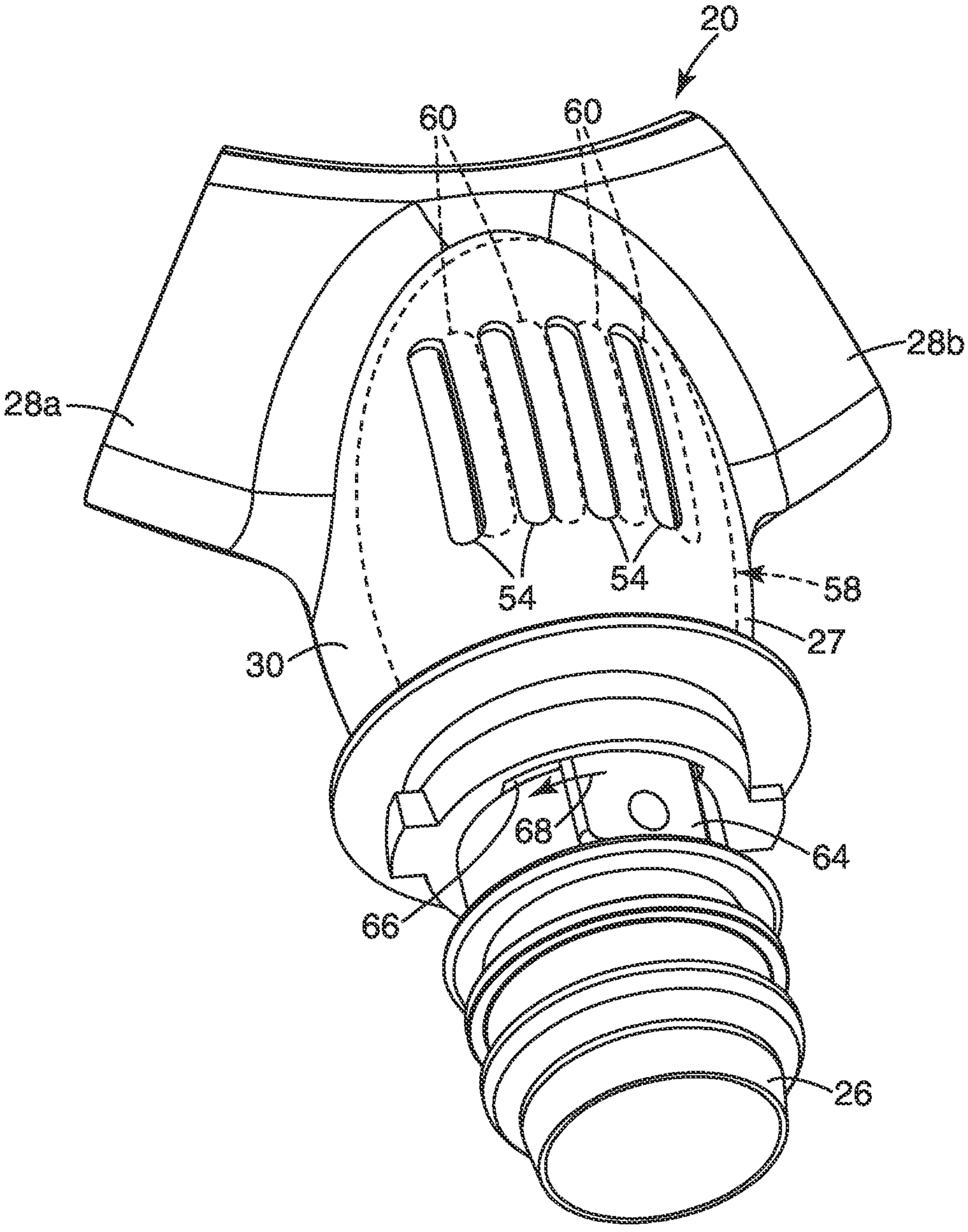
FIG. 5 is an enlarged perspective view of a portion of the assembled manifold of FIG. 4, showing a valve and actuator therefore in a closed position.

The shield plate 58 is rotatable through an arc defined about an axis of the cylindrical air inlet conduit 26, from a position shown in FIG. 5 where the openings 54 are covered, to a position shown in FIG. 6 where the openings 54 are uncovered and in alignment with the openings 60 of the shield plate 58. As seen in FIGS. 3 and 4, the shield plate 58 has an annular ring 62. The annular ring 62 is seated within the air distribution chamber 30 and air inlet conduit 26 when the manifold 20 is assembled. An arcuate actuator tab 64 extends outwardly from a bottom edge of the ring 62. The tab 64 extends through an arcuate slot 66 extending circumferentially about the air inlet conduit 26, as seen in FIGS. 3-6. The actuator tab 64 is moveable within and across the arc of the slot 66 to change the position of the shield plate 58 relative to the openings 54 on the manifold 20. In a first position, as seen in FIG. 5, the slots 54 are covered by the shield plate 58. In a second position, as seen in FIG. 6, the slots 54 are aligned with the slots 60 on the shield plate 58 and thus air is allowed to flow out of the openings 54 in the manifold 20. Arrows 68 in FIGS. 5 and 6 illustrate the possible directions of movement of the actuator tab 64 relative to the arcuate slot 66. Portions of the slot 66 not filled by the actuator tab 64 are covered by the bottom edge of annular ring 62 so that no appreciable amount of air may escape from within the manifold 20 via the slot 66. In one embodiment, the openings 54 are formed so that no more than 50% of the air flowing through the manifold 20 can flow through the openings 54 (e.g., when the openings 54 are fully aligned with openings 60 on the shield plate 58, as seen in FIG. 6). The amount of openings 54 exposed is variable between fully covered (FIG. 5) and fully opened (FIG. 6), by relative movement of the openings 60 on the shield plate 58 with respect to the openings 54 on the manifold 20.

A portion of the actuator tab 64, as seen in FIG. 3, is outside of the material of the hood 12, and thus accessible by a user while the hood is being worn. Accordingly, a user can manipulate the actuator tab 64 outside the hood 12 to control movement of the shield plate 58. The shield plate 58 serves as a valve member within the air distribution chamber 30 to vary the amount of air flowing therethrough and into the air delivery conduits 28 of the manifold 20. Of course, the more air that is allowed to flow out of the manifold 20 via the openings 54, the less air that is available to flow through the air delivery conduits 28 directly to the facial area 34 of the user 18. While the size of the slot 66 limits the amount of travel of the actuator tab 64, detents may be provided between the moveable valve and manifold to provide the user with a tactile and/or audible indication that the valve formed by the shield plate 58 is in a fully closed position (FIG. 5) or in a fully open position (FIG. 6) relative to the openings 54 on the manifold 20.

The shield plate 58 thus provides a cover adjacent the openings 54 which is moveable relative to the openings 54 to change the size of the openings 54. The actuator tab 64 is connected to the shield plate 58 (i.e., as a valve actuator outside of the hood) and permits a user wearing the respirator assembly 10 to move the shield plate 58 to a desired position relative to the openings 54 while the respirator assembly 10 is worn.

An alternative embodiment of the manifold for a respirator assembly 10 is disclosed in FIGS. 7-10. For clarity of illustration, only a manifold 120 is illustrated in FIGS. 7-10, although it is understood that the manifold 120 may be cooperatively mounted to a head harness (such as harness 14 shown in FIG. 1) and also cooperatively mounted to a hood (such as hood 12 shown in FIG. 1) via an air inlet port on the hood. In these aspects, the manifold 120 is likewise removably mounted relative to a harness and also removably mounted with respect to a hood. Thus, the advantages of reuse of the manifold 120 of FIGS. 7-10 once a hood associated therewith has been contaminated or damaged are likewise available, as discussed above with respect to manifold 20.

Figure 7:
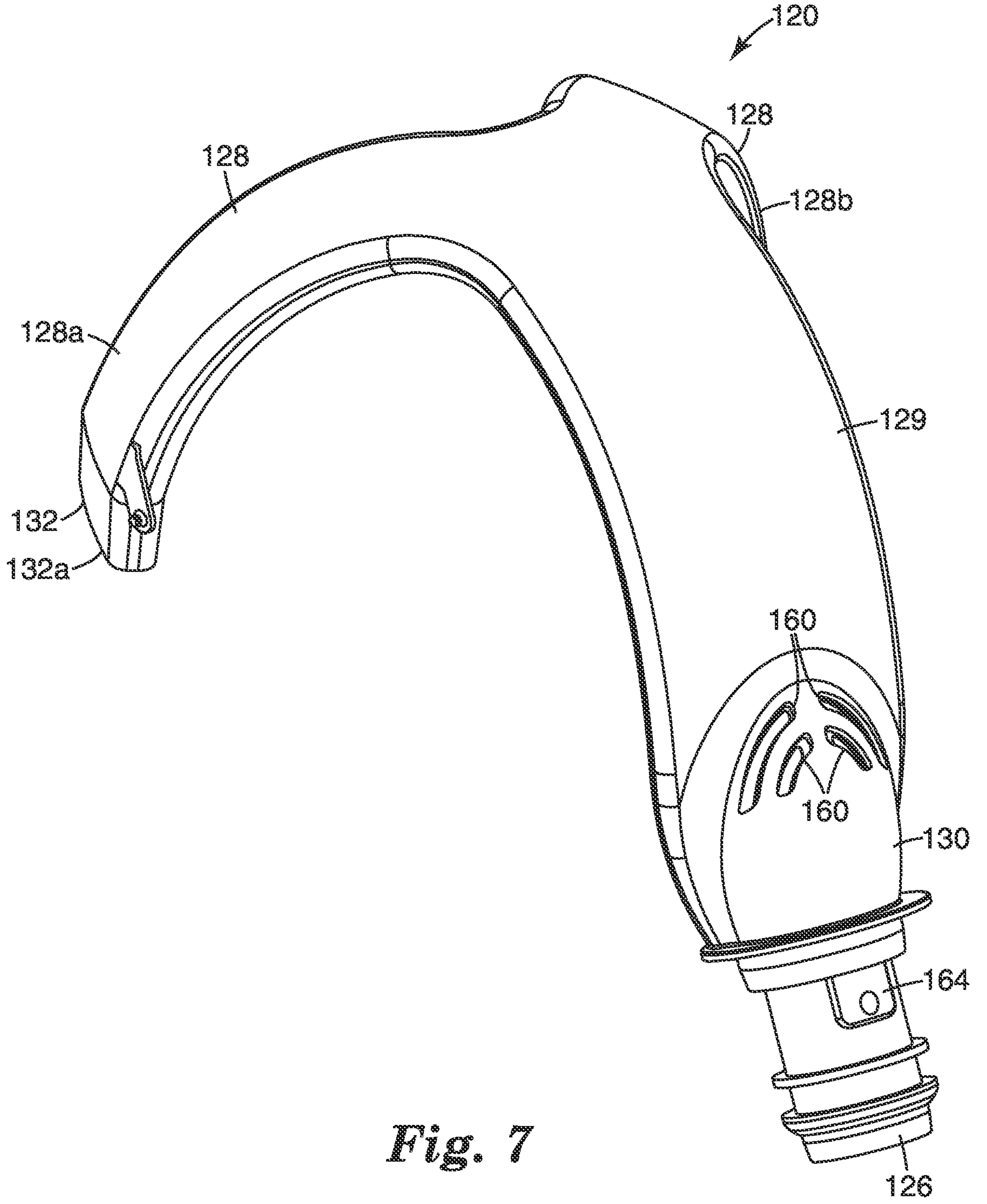
FIG. 7 is a perspective view of a second embodiment of the manifold for a respirator assembly.
Figure 8:
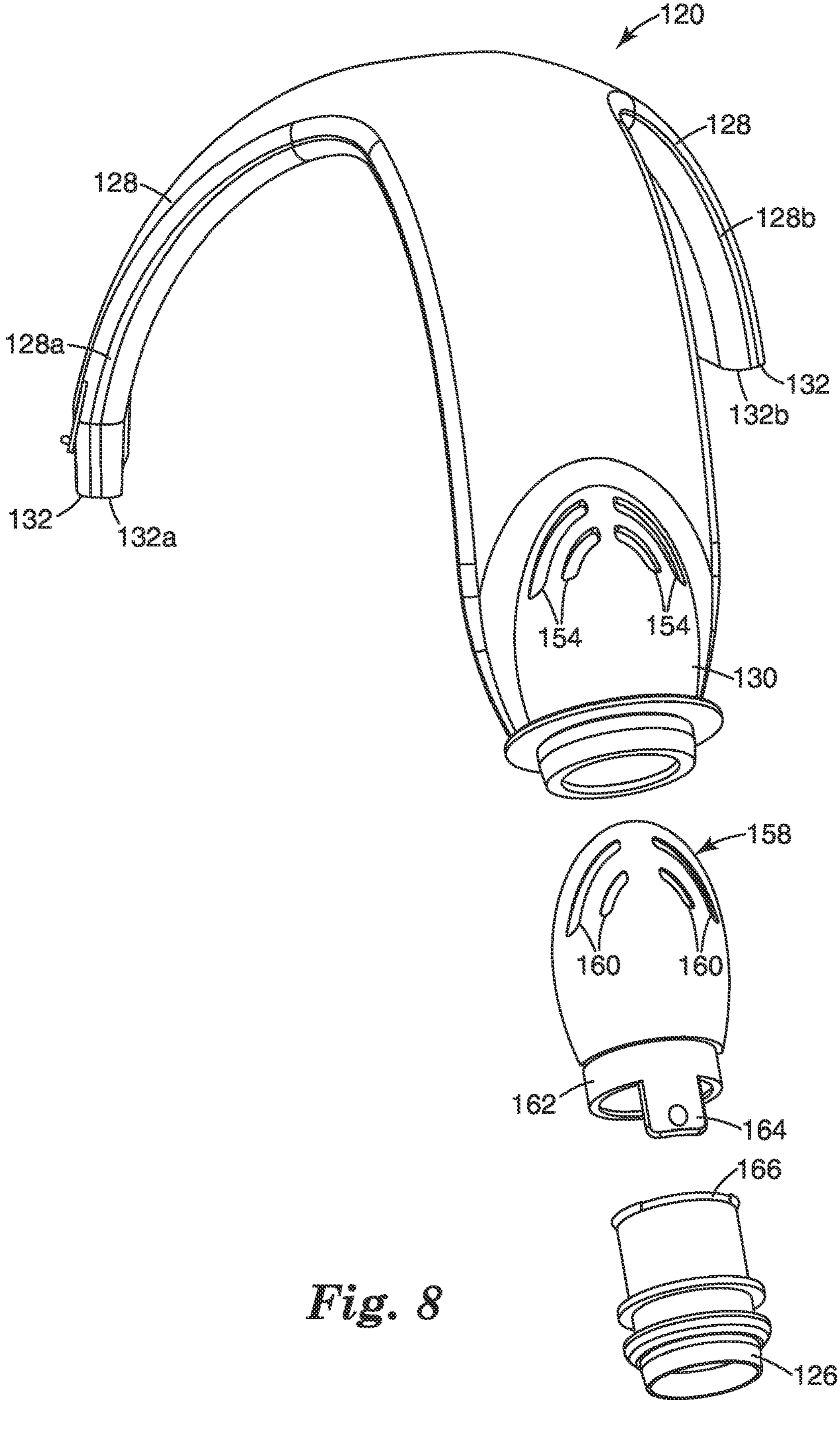
FIG. 8 is an exploded perspective view of certain components of the manifold of FIG. 7.

The manifold 120 has an air inlet conduit 126 and a plurality of air delivery conduits 128 (in FIGS. 7 and 8, two of the air delivery conduits 128*a* and 128*b* are illustrated). In one embodiment, the air inlet conduit 126 is disposed adjacent a back of the user's head (in a manner similar to that shown in FIG. 1). The air inlet conduit 126 is in fluid communication with an intermediate air delivery conduit 129 that includes an air distribution chamber 130 therein, and is also in fluid communication with each air delivery conduit 128. In use, the air distribution chamber 130 is also disposed adjacent the back of a user's head, and the intermediate air delivery conduit 129 extends forwardly from the air inlet conduit 126, centrally over a user's head. As the air delivery conduits 128 extend further forwardly from the intermediate air delivery conduit 129, they curve and split (symmetrically) to provide separate conduits for the flow of air therethrough. Each air delivery conduit 128 has an air outlet 132 (e.g., air outlet 132*a* of air delivery conduit 128*a* and air outlet 132*b* of air delivery conduit 128*b*). In one embodiment, each air outlet is adjacent the face of the user. While only two air delivery conduits 128 are illustrated on the manifold 120 in FIGS. 7 and 8, it is understood that any number of such conduits may be provided.

The air inlet conduit 126 of the manifold 120 extends through an air inlet port of a hood and is in fluid communication with a supply of breathable air, in the same manner as disclosed with respect to hose 40 and supply 42 of breathable air in relation to the embodiment of FIG. 1. Air flows into the air inlet conduit 126 of the manifold 120, then flows through the intermediate air delivery conduit 129, and its air distribution chamber 130, and into each of the air delivery conduits 128. Air flows out of each air delivery conduit 128 from its air outlet 132 and into a breathable air zone defined by the hood about the head of a user for inhalation by the user.

The hood, as described above, is often non-shape stable and serves as a shell for the respirator assembly, while the manifold 120 is shape stable. The connection between the hood and the manifold 120 via the air inlet port of the hood is similar to that described with respect to the embodiment of FIGS. 1-6, using a lock ring or the like to sealably attach the manifold 120 to the hood yet allow the air inlet conduit 126 of the manifold to extend out from the hood to receive supplied air. Other than the different shape of the manifold 120 relative to the shape of the manifold 20, and to the variations in the valve structures therebetween, (as explained below) the manifold 120 interacts with a hood and harness in the same way as described above, and achieve the same air delivery functionality as described above. In addition, the manifold 120 may be formed from the same materials as disclosed for the manifold 20.

FIG. 8 illustrates, in an exploded view, certain components of the manifold 120. In this case, that portion of the manifold 120 defining air conduits 128 and 129 is shown assembled. A set of one or more openings 154 are disposed through the manifold 120 and into the air distribution chamber 130 thereof. In this exemplary embodiment, each of the openings 154 is arcuate in shape, and some of them have different lengths. The openings 154 are aligned so that as air is allowed to flow out of the air distribution chamber 130 through the openings 154, the air flows away from the head of the user, yet still within the shell defined by the hood.

A valve comprises a shield plate 158 that is moveable to cover and uncover the openings 154 on the manifold 120. The shield plate 158 is functionally similar to the shield plate 58 of the embodiment of FIGS. 1-6. It mates with the air distribution chamber 130 to cover and uncover the openings 154. The shield plate 158 has a plurality of openings 160 therethrough, with the same number and shape of openings 160 as the openings 154, and the openings 160 are formed to be selectively aligned with the openings 154 (as seen in FIGS. 7 and 10).

Figure 9:
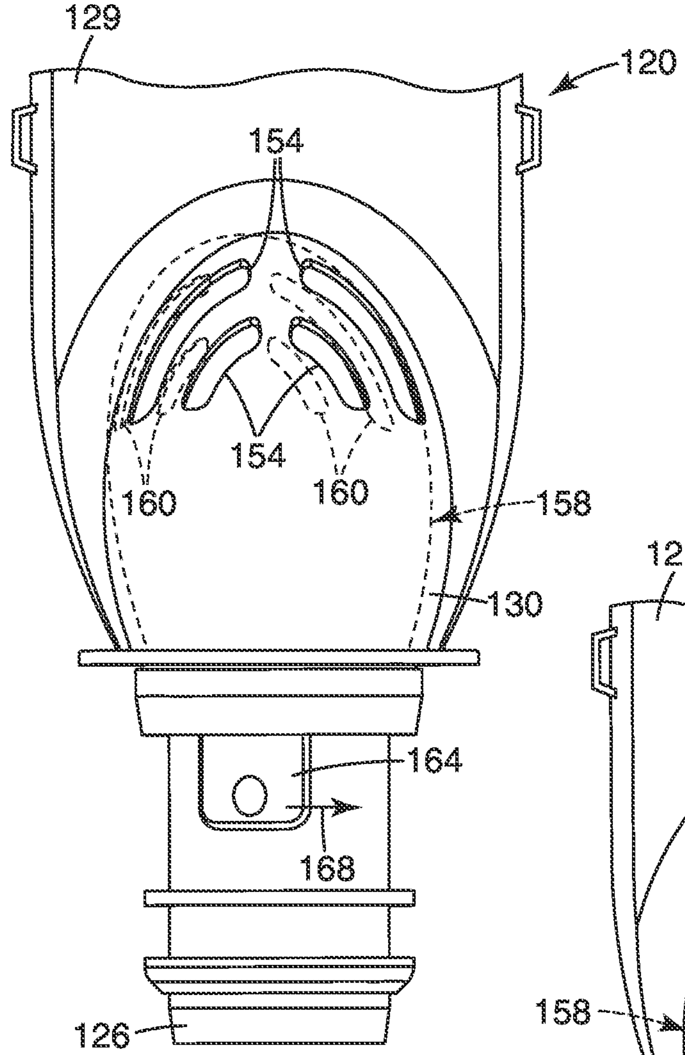
FIG. 9 is an enlarged rear elevational view of a portion of the assembled manifold of FIG. 7, showing a valve and actuator therefore in a closed position.
Figure 10:
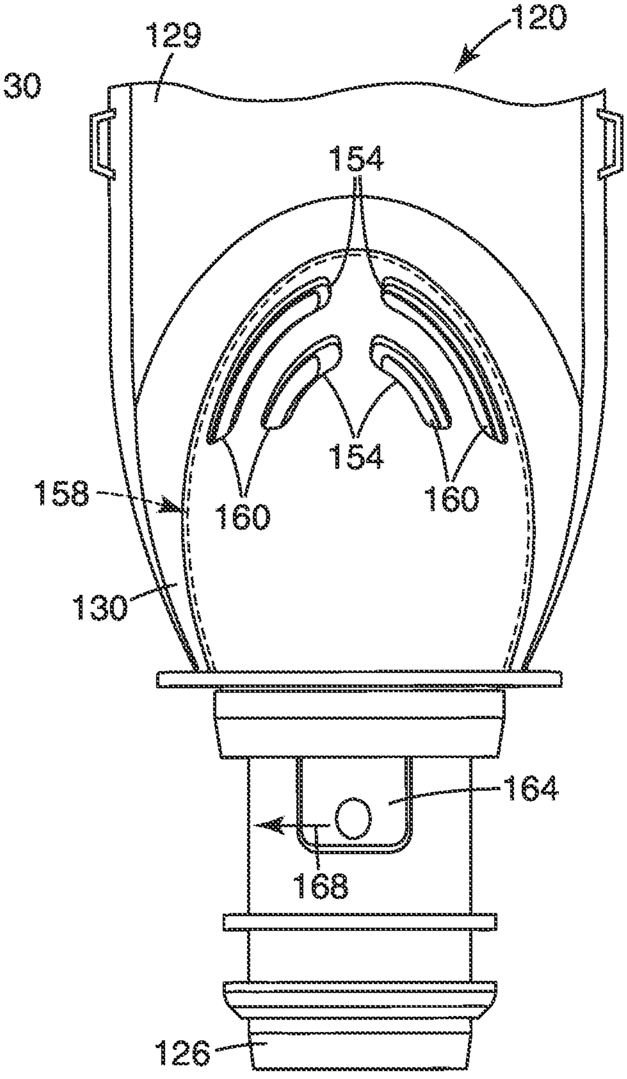
FIG. 10 is a view similar to FIG. 9, showing the valve and actuator in an open position.

The shield plate 158 is rotatable through an arc defined about an axis of the cylindrical air inlet conduit 126, from a position shown in FIG. 9, wherein the openings 154 are covered, to a position shown in FIG. 10, where the openings 154 are uncovered and in alignment with the openings 160 of the shield plate 158. The shield plate 158 has an annular ring 162 that is seated within the air distribution chamber 130 and air inlet conduit 126 when the manifold 120 is assembled. An arcuate actuator tab 164 extends outwardly from a bottom edge of the ring 162. The tab 164 extends through an arcuate slot 166 extending circumferentially about the air inlet conduit 126, as seen in FIG. 8. The arcuate tab 164 is moveable within and across the arc of the slot 166 to change the position of the shield plate 158 relative to the openings 154 on the manifold 120. In a first position, as seen in FIG. 9, the openings 154 are covered by the shield plate 158. In a second position, as seen in FIG. 10, the openings 154 are aligned with the openings 160 on the shield plate 158 and thus air is allowed to flow out of the openings 154 in the manifold 120. Arrows 168 in FIGS. 9 and 10 illustrate the directions of movement of the actuator tab 164 relative to the arcuate slot 166. Portions of the slot 166 not filled by the actuator tab 164 are covered by the bottom edge of the annular ring 162 so that no appreciable amount of air may escape from within the manifold 120 via the slot 166. In one embodiment, the openings 154 are formed so that no more than 50% of the air flowing through the manifold 120 can flow through the openings 154 (e.g., when the openings 154 are fully aligned with the openings 160 on the shield plate 158, as seen in FIG. 10). The amount of openings 154 exposed is variable between fully covered (FIG. 9) and fully opened (FIG. 10), by relative movement of the openings 160 on the shield plate 158 with respect to the openings 154 on the manifold 120.

Like the actuator tab 64 of the embodiment shown in FIGS. 1-6, a portion of the actuator tab 164 of the embodiment of FIGS. 7-10 is outside of the material of the hood, and thus accessible by a user while the hood is being worn in order to manipulate the position of the shield plate 158 relative to the openings 154. The shield plate 158 serves as a valve member within the air distribution chamber 130 to vary the amount of air flowing therethrough and into the air delivery conduits 128 of the manifold 120. The more air that is allowed to flow out of the manifold 120 through the openings 154, the less air that is then available to flow through the delivery conduits 128 directly to the facial area of a user. While the size of the slot 166 limits the amount of travel of the actuator tab 164, detents may be provided between the moveable valve and manifold to provide the user with a tactile and/or audible indication that the valve formed by the shield plate 158 is in a fully closed position (FIG. 9) or in a fully opened position (FIG. 10) relative to the openings 154 of manifold 120.

The shield plate 158 thus provides a cover adjacent the openings 154 which is moveable relative to the openings 154 to change the size of the openings 154. The actuator tab 164 is operably connected to the shield plate 158 (i.e., as a valve actuator outside of the hood) and permits the user wearing the respirator assembly to move the shield plate 158 to a desired position relative to the openings 154 while the respirator assembly is worn.

An alternative embodiment of the manifold for a respirator assembly 10 is disclosed in FIGS. 11-16. Again, for clarity of illustration, only a manifold 220 is illustrated in FIGS. 11-16, although it is understood that the manifold 220 may be cooperatively mounted to a head harness (such as harness 14 shown in FIG. 1) and also cooperatively mounted to a hood (such as hood 12 shown in FIG. 1) via an air inlet port on the hood. In these aspects, the manifold 220 is likewise removably mounted relative to a harness and also removably mounted with respect to a hood. Thus, the advantages of reuse of the manifold 220 of FIGS. 11-16 once a hood associated therewith has been contaminated or damaged are likewise available, as discussed above with respect to manifolds 20 and 120.

The manifold 220 has an air inlet conduit 226 and a plurality of air delivery conduits 228 (in FIGS. 11-16, two of the air delivery conduits **228*a* and 228*b* are illustrated). In one embodiment, the air inlet conduit 226 is disposed adjacent a back of the user's head (again in a manner similar to that disposed and shown in FIG. 1). The air inlet conduit 226 is in fluid communication with an intermediate air delivery conduit 229 and in fluid communication with each air delivery conduit 228. In use, the air inlet conduit 226 and intermediate air delivery conduit 229 are disposed adjacent the back of a user's head, with the intermediate air delivery conduit 229 extending forwardly from the air inlet conduit 226, centrally relative to a user's head. As the air delivery conduits 228 extend further forwardly from the intermediate air delivery conduit 229, they curve and split (symmetrically) to provide separate conduits for the flow of air therethrough. Each air delivery conduit 228 has an air outlet 232 (e.g., air outlet 232***a* of air delivery conduit 228*a* and air outlet 232*b* of air delivery conduit 228*b*). In one embodiment, each air outlet 232 is adjacent the face of the head of the user. While only two air delivery conduits 228 are illustrated on the manifold 220 in FIGS. 11-16, it is understood that any number of such conduits may be provided.

The inlet conduit 226 of the manifold 220 extends through an air inlet port of a hood and is in fluid communication with a supply of breathable air, in the same manner as disclosed with respect to hose 40 and supply 42 of breathable air in relation to the embodiment of FIG. 1. Air flows into the air inlet conduit 226 of the manifold 220, then flows through the intermediate air delivery conduit 229 and into each of the air delivery conduits 228. Air flows out of each air delivery conduit 228 from its air outlet 232 and into a breathable air zone defined by the hood about the head of a user for inhalation by the user.

The hood, as described above, is non-shape stable, and serves as a shell for the respirator assembly, while the manifold 220 is shape stable. The connection between the hood and the manifold 220 via the air inlet port of the hood is similar to that described with respect to the embodiment of FIGS. 1-6, using a lock ring or the like to sealably attach the manifold 220 to the hood yet allow the air inlet conduit 226 of the manifold to extend out from the hood to receive supplied air. Other than the different shape of the manifold 220 relative to the manifolds 20 and 120, and to the variations in the valve structures therebetween (as explained below), the manifold 220 interacts with a hood and harness in the same way as described above, and achieves the same air delivery functionality as described above.

Figure 11:
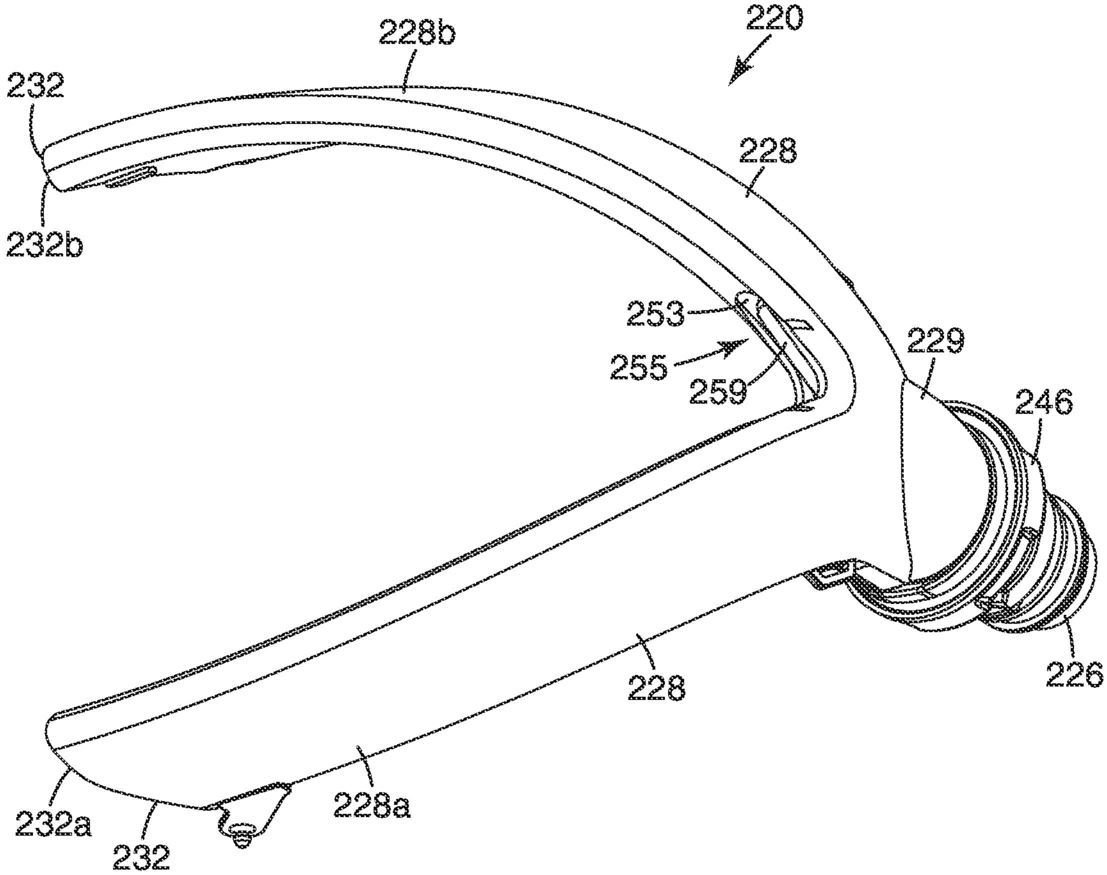
FIG. 11 is a perspective view of a third embodiment of the manifold for a respirator assembly.
Figure 12:
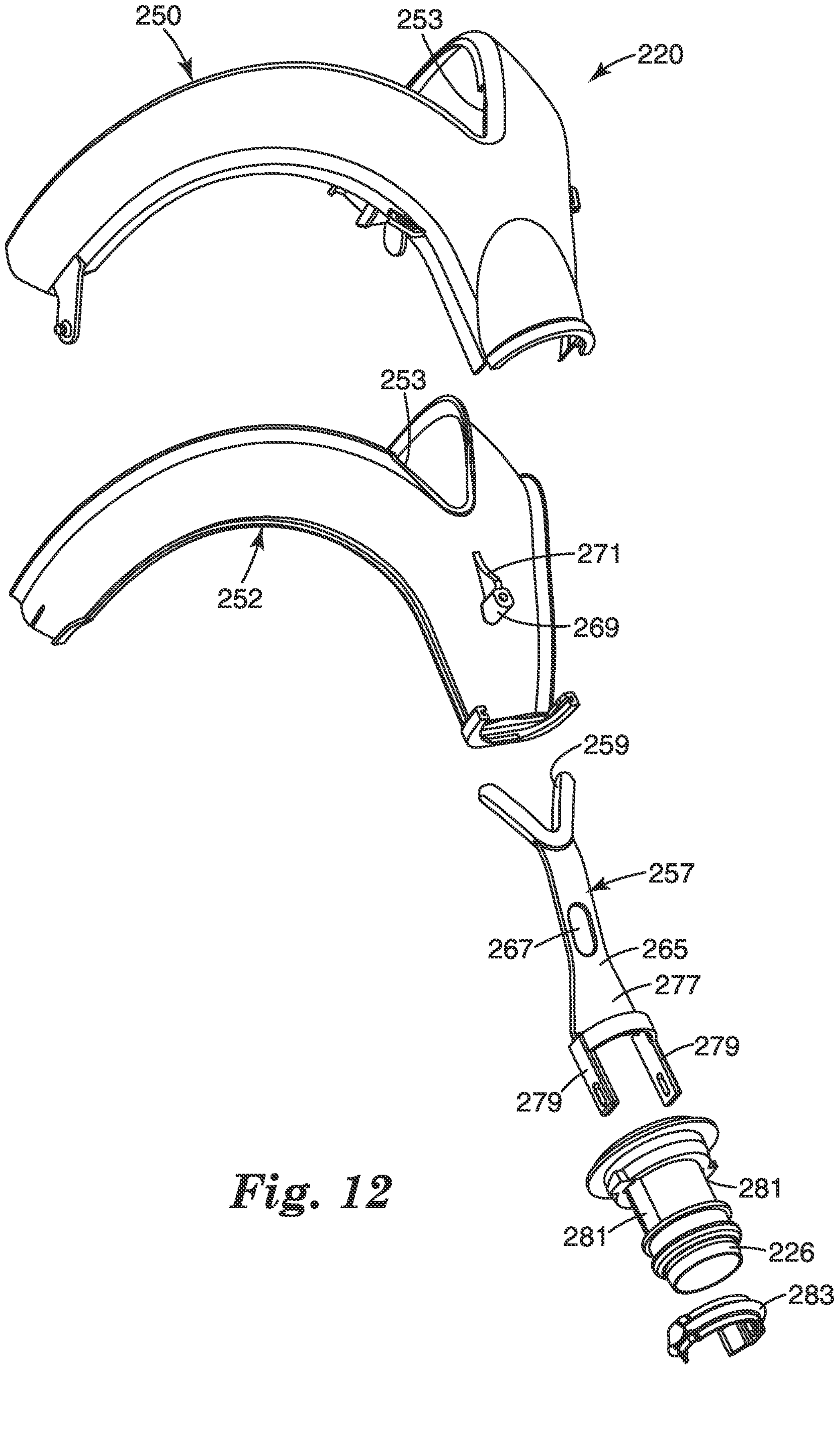
FIG. 12 is an exploded perspective view of the manifold of FIG. 11, without a lock ring.

In one embodiment, the manifold 220 is formed (i.e., molded) from a thermoplastic polymer material such as, for example, polypropylene, polyethylene, polythene, nylon/epdm mixture and expanded polyurethane foam. Such materials might incorporate fillers or additives such as pigments, hollow glass, microspheres, fibers, etc. FIG. 11 illustrates the manifold 220 in assembled form. FIG. 12 illustrates the manifold 220 in an exploded view, wherein in this embodiment, the manifold 220 has an upper half 250 and lower half 252. The upper and lower halves 250 and 252 are formed to fit or mate together to define the manifold 220, with the space between the upper and lower halves 250 and 252 forming air delivery conduits 228 and 229 (that are in fluid communication with the air inlet conduit 226 coupled thereto). Upon assembly, the upper and lower halves 250 and 252 are secured together by a plurality of suitable fasteners (such as threaded fasteners) or may be mounted together using thermal or ultrasonic bonding techniques, or other suitable fastening arrangement. Once assembled, it is not contemplated that any portion of the manifold be separated from the manifold, other than the lock ring 246.

In one embodiment, a valve is again provided for the manifold to allow the release of air flowing therethrough through one or more openings in the manifold prior to the air reaching the air outlets 232 of the air delivery conduits 228. In the illustrated embodiment, an opening 253 is provided in the manifold 220 at the point where the manifold 220 splits (symmetrically) from one air delivery conduit 229 to two air delivery conduits 228*a* and 228*b*, such as at juncture area 255. Thus, air flowing out of the opening 253 flows alongside and over the head of a user (as opposed to away from the head like the openings in manifolds 20 and 120).

Figure 13:
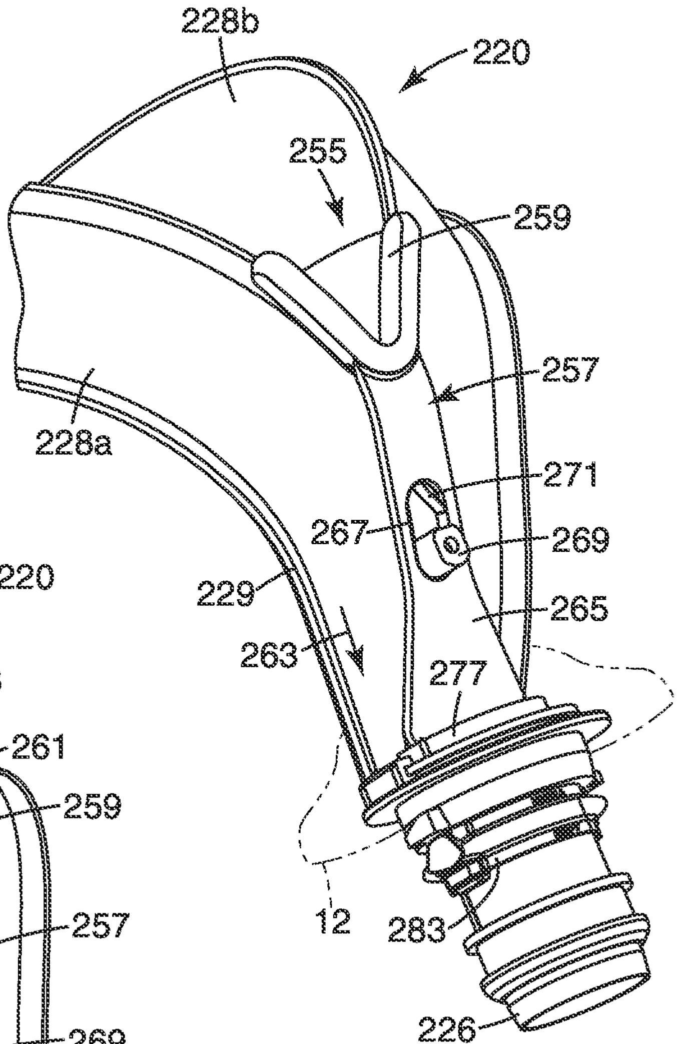
FIG. 13 is an enlarged perspective view of a portion of the manifold of FIG. 11, with an upper portion of the manifold removed, showing a valve and actuator therefore in a closed position.

A valve comprises a valve member 257 that is moveable to selectively open and close the opening 253 in the manifold 220. The valve member 257 includes a valve face seal 259 which is shaped to mate with interior edges (such as edges 261 shown in FIG. 14) of the opening 253. The valve member 257 is moveable toward and away from the opening 253 to close and open it, respectively. FIG. 13 illustrates the valve member 257 moved with its valve face seal 259 into the opening 253 to close it, while FIG. 14 illustrates the valve member 257 with its valve face seal 259 moved away from the opening 253, thereby unsealing it and permitting the flow of air therethrough from within the manifold 220.

Figure 14:
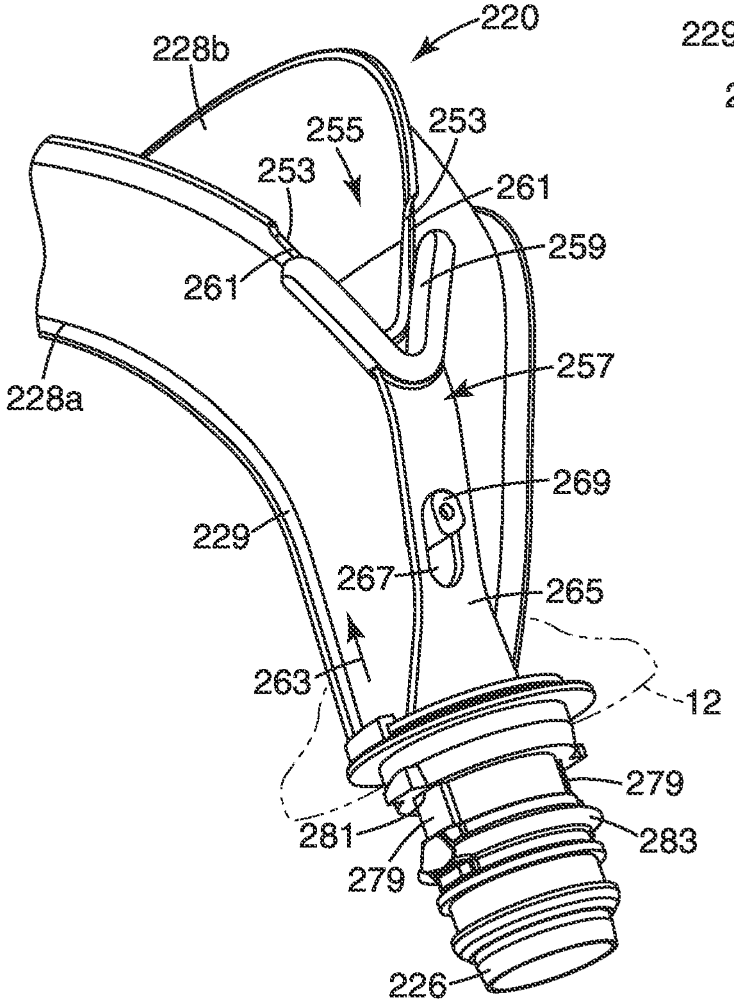
FIG. 14 is a view similar to FIG. 13, showing the valve and actuator in an open position.

The valve member 257 is moved relative to the opening 253 by sliding it back and forth, in direction of arrows 263 in FIGS. 13 and 14. The valve member 257 is formed from a plate 265 that at a first end is joined or formed as the valve face seal 259. The plate 265 has an elongated aperture 267 therein. A spacer 269 between the upper and lower halves 250 and 252 of the manifold 220 extends through the elongated aperture. The spacer 269 includes a plate ramp surface 271 that is disposed for engagement with an edge of the elongated aperture 267 in the plate 265. Thus, when the plate 265 is moved away from the opening 253, the plate ramp surface 271 urges portions of the plate 265 upwardly away from the lower half 252 of the manifold 220 (as illustrated in FIG. 14). When the plate 265 is moved toward the opening 253, the plate ramp surface 271 allows the valve face seal 259 to lower into a sealed closure position relative to the opening 253 (as illustrated in FIG. 13).

The valve member 257 includes an annular ring 277, which is connected to a second end of the plate 265. The annular ring 277 is slidably disposed within a cylindrical bore in the air inlet conduit 226 when the manifold 220 is assembled (see, e.g., cylindrical bore 377*a* for like ring 377 of the embodiment illustrated in FIGS. 18 and 19). A pair of arcuate actuator tabs 279 extend outwardly from a bottom edge of the ring 277 (see FIG. 12). The tabs 279 are disposed on opposite sides of the ring 277 and in opposed longitudinal alignment with the connections of the ring 277 to the plate 265. Each tab 279 extends through a respective arcuate slot 281 extending circumferentially about the air inlet conduit 226, as seen in FIGS. 12-14.

Figure 15:
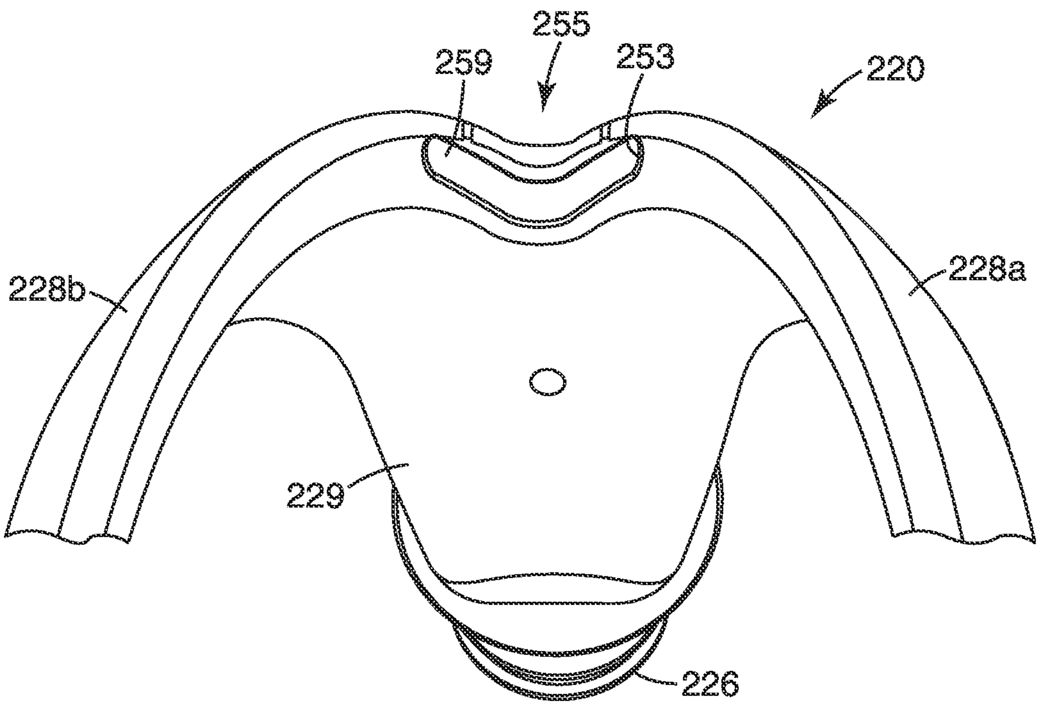
FIG. 15 is an enlarged perspective view of a portion of the manifold of FIG. 11, as viewed from the front of the manifold and showing the valve in a closed position.
Figure 16:
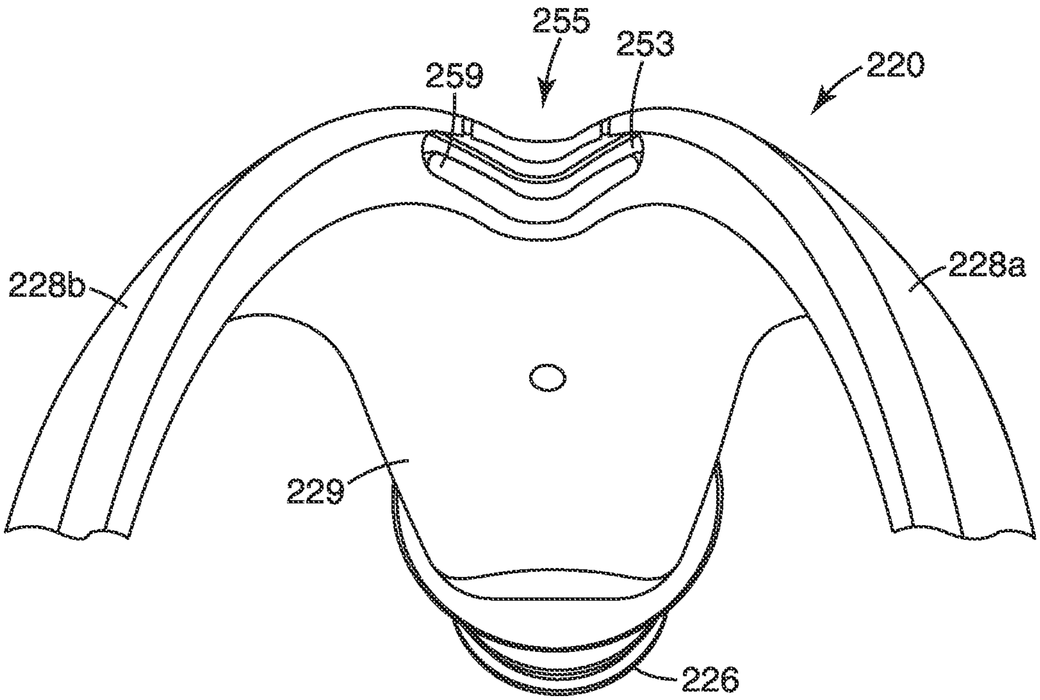
FIG. 16 is a view similar to FIG. 15, showing the valve in an open position.

The actuator tabs 279 are moveable longitudinally (along the direction of an axis of the air inlet conduit 226) through the slots 281 to change the position of the valve face seal 259 relative to the opening 253 on the manifold 220. In a first position, as seen in FIGS. 13 and 15, the opening 253 is covered by the valve face seal 259. In a second position, as seen in FIGS. 14 and 16, the opening 253 is uncovered, and the valve face seal 259 is spaced away therefrom. Each slot 281 is sized to slidably receive its respective tab 279 therein, and thereby permit movement of the tab 279 therethrough in direction of arrows 263 in FIGS. 13 and 15. The slots 281 are dimensioned relative to the tabs 279 so that no appreciable amount of air may escape from within the manifold 220 via the slots 281. In one embodiment, the opening 253 is formed so that no more than 50% of the air flowing through the manifold 220 can flow through the opening 253. The amount of air flow through the opening 253 is variable dependent upon the position of the valve face seal 259 relative to the opening 253, with flow permitted at any flow level between fully closed (an opening fully covered position of the valve face seal 259 (FIGS. 13 and 15)) and fully opened (an openings fully opened position of the valve face seal 259 (FIGS. 14 and 16)).

Portions of the actuator tabs 279, as seen in FIGS. 13 and 14, are outside of the material of the hood (represented in FIGS. 13 and 14 by phantom hood 12), and thus are accessible by a user when the hood is being worn in order to manipulate the position of the valve member 257 relative to the opening 253. The valve member 257 thus serves to vary the amount of air flowing through the manifold 220 to its air outlets 232. If the valve member 257 is opened at all, air will flow out of the opening 253, and thus less air will flow out of the air outlets 232. The amount of longitudinal travel of the valve member 257 is limited by, on the one hand, engagement of the valve seal face 259 with the opening 253, and, on the other hand, with engagement of a bottom edge of the annular ring 277 with a shoulder at the bottom of the cylindrical bore within the air inlet conduit 226. Detents may be provided between the valve member 257 and manifold 220 to provide the user with a tactile and/or audible indication that the valve formed by the valve members 257 is in a fully closed position (FIGS. 13 and 15) or in a fully open position (FIGS. 14 and 16) relative to the opening 253 of the manifold 220.

A C-shaped ring member 283 (see FIG. 12) may be fixed on each of the actuator tabs 279 (outside of the hood) to further facilitate user manipulation of the actuator tabs 279. The ring member 283 may have one or more ribs or other features thereon to facilitate the handling and movement thereof relative to the air inlet conduit 226 (which in turn would move the actuator tabs 279, and hence the valve member 257). The actuator tabs 279 and associated ring member 283 serve as a valve actuator outside of the hood and permit the user wearing the respirator assembly to move the valve member 257 to a desired position relative to the opening 253 while the respirator is worn.

The manifold 220 illustrated in FIGS. 11-16 thus provides a shape stable manifold having a valve which is operable from outside of the respirator hood to open and close the opening within the manifold 220 inside of the shell of the respirator assembly. This actuation is achieved by linear movement of a valve actuator (the actuator tabs 279 and associated ring member 283) on the outside of the hood adjacent the back of the user's head. Thus, a user can easily modify the air flow through the manifold 220 between a condition where all air flowing through the manifold exits the manifold adjacent the facial area via the air outlets 232 and a condition where some or up to half of the air flowing through the manifold exits the manifold through the opening 253, thereby flowing across the top of the user's head for cooling purposes.

Figure 17:
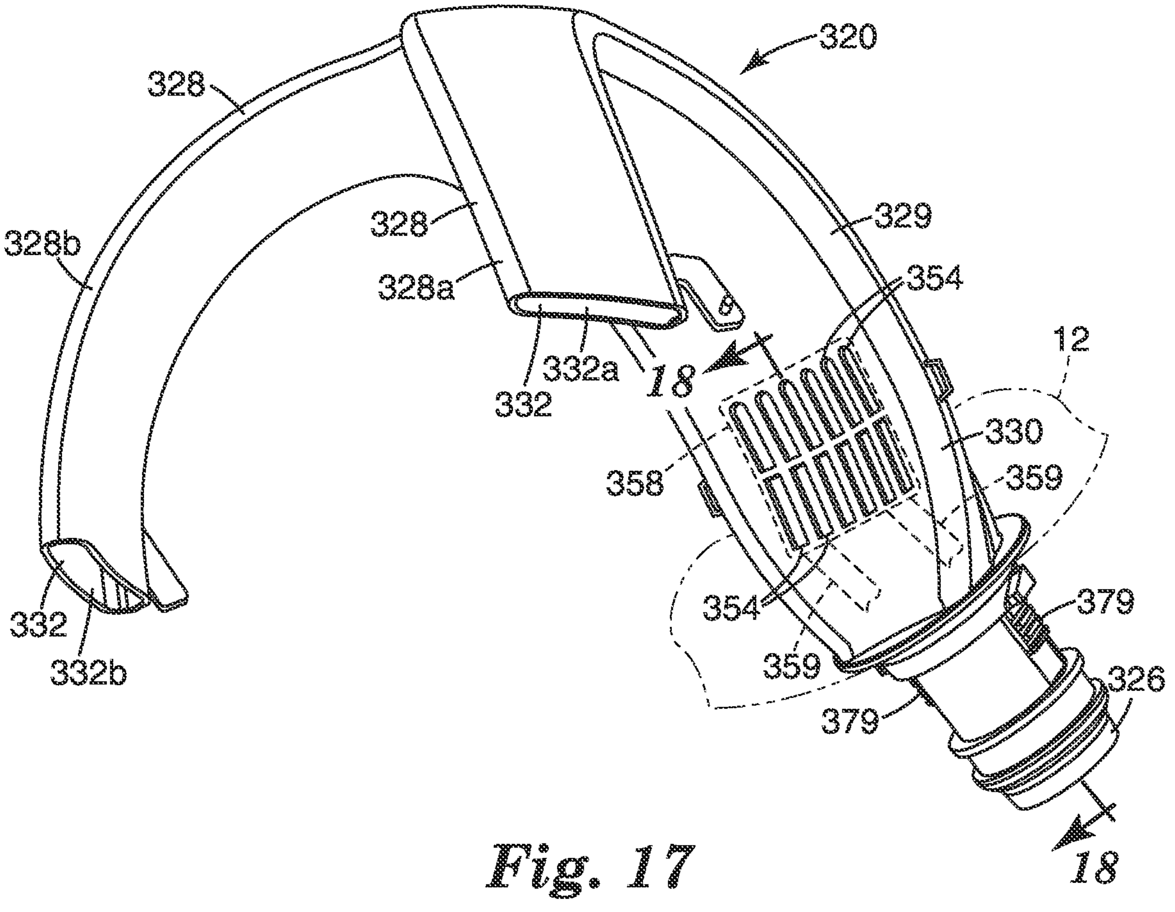
FIG. 17 is a perspective view of a fourth embodiment of the manifold for a respirator assembly.
Figure 18:
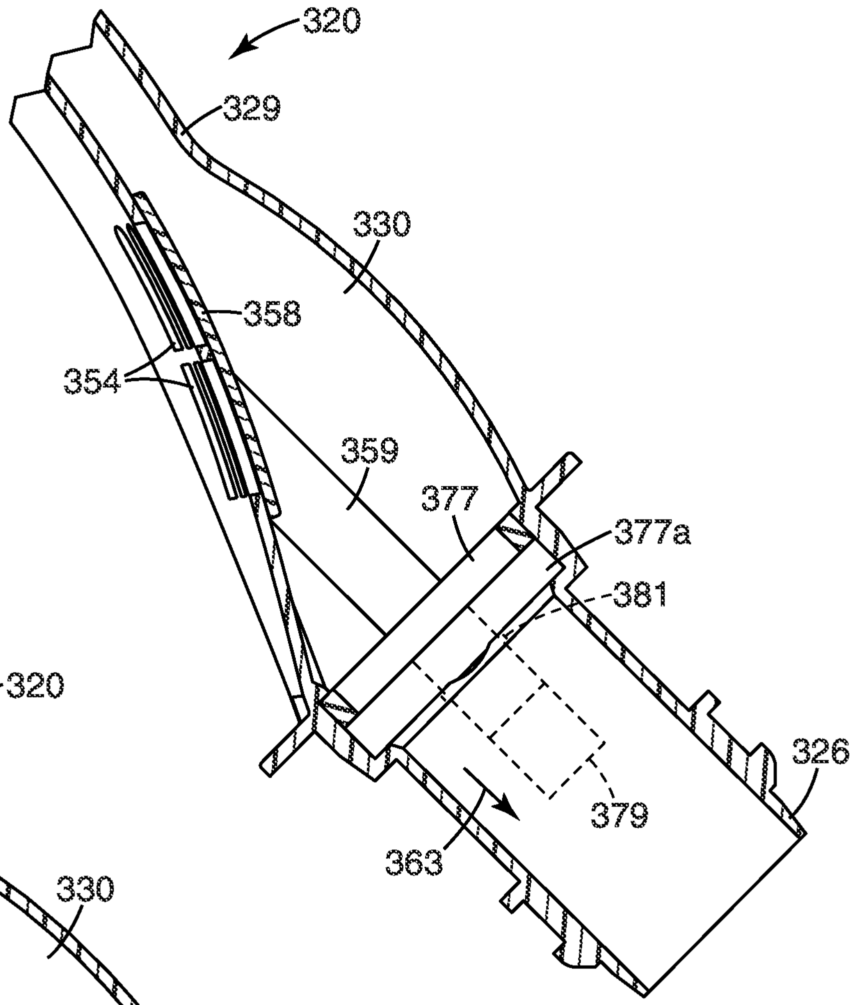
FIG. 18 is an enlarged partial sectional view as taken along lines 18-18 in FIG. 16, showing a valve and actuator therefore in a closed position.
Figure 19:
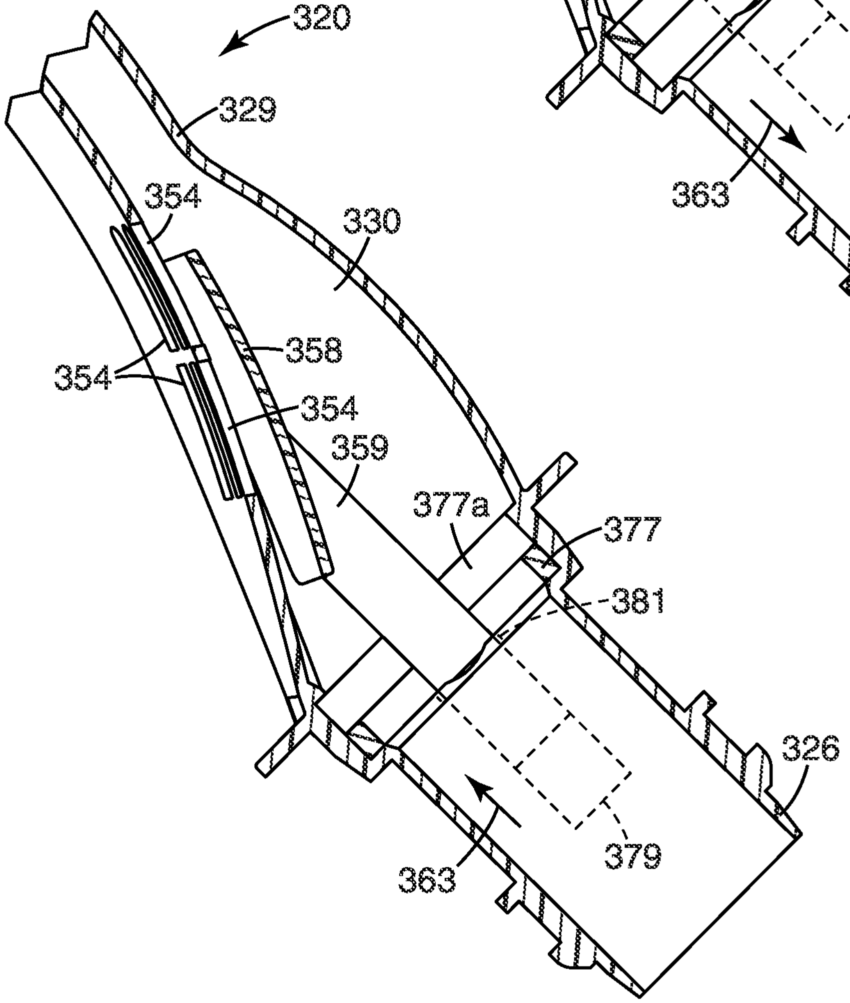
FIG. 19 is a view similar to FIG. 18, showing the valve and actuator in an open position.

An alternative embodiment of the manifold for a respirator assembly 10 is disclosed in FIGS. 17-19. For clarity of illustration, only a manifold 320 is illustrated in FIGS. 17-19, although it is understood that the manifold 320 may be cooperatively mounted to a head harness (such as harness 14 shown in FIG. 1) and also cooperatively mounted to a hood (such as hood 12 shown in FIG. 1) via an air inlet port on the hood. In these aspects, the manifold 320 is likewise removably mounted relative to a harness and also removably mounted with respect to a hood. Thus, the advantages of reuse of a manifold 320 of FIGS. 17-19 once a hood associated therewith has been contaminated or damaged are likewise available, as discussed above with respect to manifold 20.

The manifold 320 has an air inlet conduit 326 and a plurality of air delivery conduits 328 (in FIG. 17, two of the air delivery conduits 328*a* and 328*b* are illustrated). In one embodiment, the air inlet conduit 326 is disposed adjacent the back of the user's head (in a manner similar to that shown in FIG. 1). The air inlet conduit 326 is in fluid communication with an intermediate air delivery conduit 329 that includes an air distribution chamber 330 therein, and is also in fluid communication with each air delivery conduit 328. In use, the air distribution chamber 330 is also disposed adjacent the back of a user's head, and the intermediate air delivery conduit 329 extends forwardly from the air inlet conduit 326 centrally over a user's head. As the air delivery conduits 328 extend further forwardly from the intermediate air delivery conduit 329, they curve and split (symmetrically) to provide separate conduits for the flow of air therethrough. Each air delivery conduit 328 has an air outlet 332 (e.g., air outlet 332*a* of air delivery conduit 328*a* and air outlet 332*b* of air delivery conduit 328*b*). In one embodiment, each air outlet 332 is adjacent the face of the head of the user. While only two air delivery conduits 328 are illustrated on the manifold 320 in FIG. 17, it is understood that any number of such conduits may be provided.

The air inlet conduit 326 of the manifold 320 extends through an air inlet port of a hood and is in fluid communication with a supply of breathable air, in the same manner as disclosed with respect to hose 40 and supply 42 of breathable air in relation to the embodiment of FIG. 1. Air flows into the air inlet conduit 326 of the manifold 320, then flows through the intermediate air delivery conduit 329, and its air distribution chamber 330, and into each of the air delivery conduits 328. Air flows out of each air delivery conduit 328 from its air outlet 332 and into a breathable air zone defined by the hood about the head of a user for inhalation by the user.

The hood, as described above, is non-shape stable and serves as a shell for the respirator assembly, while the manifold 320 is shape stable. The connection between the hood and the manifold 320 via the air inlet port of the hood is similar to that described with respect to the embodiment of FIGS. 1-6, using a lock ring or the like to sealably attach the manifold 320 to the hood yet allow the air inlet conduit 326 of the manifold to extend out from the hood to receive supplied air. Other than the different shape of the manifold 320 relative to the shape of the manifolds 20, 120 and 220, and to the variations in the valve structures therebetween (as explained below), the manifold 320 interacts with a hood and harness in the same way as described above, and achieves the same air delivery functionality as described above. In addition, the manifold 320 may be formed from the same materials as disclosed for the manifold 20.

As air flows through the manifold 320 from the air inlet conduit 326, it may in one embodiment only leave the manifold 320 via the air outlets 332. However, in another embodiment, air outlets for the air may be provided at other locations along the manifold 320. For instance, as shown in FIG. 17, one or more openings 354 may be provided on a lower portion of the manifold, facing a user's head. FIG. 17 illustrates a first set of a plurality of openings 354 through a wall of the manifold in the intermediate air delivery conduit 329 that defines the air distribution chamber 330. In one exemplary arrangement, as illustrated, the openings 354 may be disposed in a grill format, although the openings may be of any size and number and configuration. The openings 354 are aligned so that as air is allowed to flow out of the air distribution chamber 330 through the openings 354, the air flows toward the head of the user and within the shell defined by the hood.

A valve comprises a shield plate 358 that is moveable to cover and uncover the openings 354 on the manifold 320. The shield plate 358 is moved toward and away from the opening 354 similar to the valve movement of the valve of the embodiment illustrated in FIGS. 11-16. The shield plate 358 is attached via one or more connectors 359 to an annular ring 377. The annular ring 377 is slidably disposed for longitudinal travel (relative to an axis of the air inlet conduit 326) within a cylindrical bore 377_a_ in the air inlet conduit 326. A pair of arcuate actuator tabs 379 extend outwardly from a bottom edge of the ring 377.

The tabs 379 are disposed on opposite sides of the ring 377 and in opposed longitudinal alignment with the connectors 359. Each tab 379 extends through an arcuate slot 381 extending circumferentially about the air inlet conduit 326. The actuator tabs 379 are moveable longitudinally (in direction of arrows 363 in FIGS. 18 and 19) through the slots 381 to change the position of the shield plate 358 relative to the openings 354 on the manifold 320. In a first position, as seen in FIG. 18, the openings 354 are covered by the shield plate 358. In a second position, as seen in FIG. 19, the openings 354 are uncovered, and the shield plate 358 is spaced away therefrom. Each slot 381 is sized to slidably receive its respective tab 379 therein, and thereby permit movement of the tab 379 extending therethrough in direction of arrows 363. The slots 381 are dimensioned relative to the tabs 379 so that no appreciable amount of air may escape from within the manifold 320 via the slots 381. In one embodiment, the openings 354 are formed so that no more than 50% of the air flowing through the manifold 320 can flow through the openings 354. The amount of air flow through the openings 354 is variable dependent upon the position of the shield plate 358 relative to the openings 354, with flow permitted at any flow level between fully closed (an openings fully covered position of the shield plate 358 (FIG. 18)) and fully open (an openings fully opened position of the shield plate 358 (FIG. 19)).

Portions of each actuator tab 379, as seen in FIG. 17, are outside of the material of the hood (represented in FIG. 17 by phantom hood 12), and thus accessible by a user when the hood is being worn in order to manipulate the position of the shield plate 358 relative to the openings 354. The shield plate 358 thus serves as a valve member to vary the amount of air flowing through the conduit to its air outlets 332. If the shield plate 358 is opened at all, then air will flow out of the openings 354, and thus less air will flow out of air outlets 332. The amount of longitudinal travel of the shield plate 358 is limited by, on the one hand, engagement of the shield plate 358 with the openings 354, and, on the other hand, with the engagement of a bottom edge of the annular ring 377 with a shoulder at the bottom of the cylindrical bore 377_a_ within the air inlet conduit 326. Detents may be provided between the valve structure bearing shield plate 358 and manifold 320 to provide the user with a tactile and/or audible indication that the valve formed by the valve shield 358 is in a fully closed position (FIG. 18) or a fully open position (FIG. 19) relative to the openings 354 of the manifold 320.

The shield plate 358 thus provides a cover adjacent the openings 354 which is moveable relative to the openings 354 to change the size of the openings 354. The actuator tabs 379 are operably connected to the shield plate 358 (i.e., as a valve actuator outside of the hood) and permit the user wearing the respirator assembly to move the shield plate 358 to a desired position relative to the openings 354 while the respirator assembly is worn.

Figure 20:
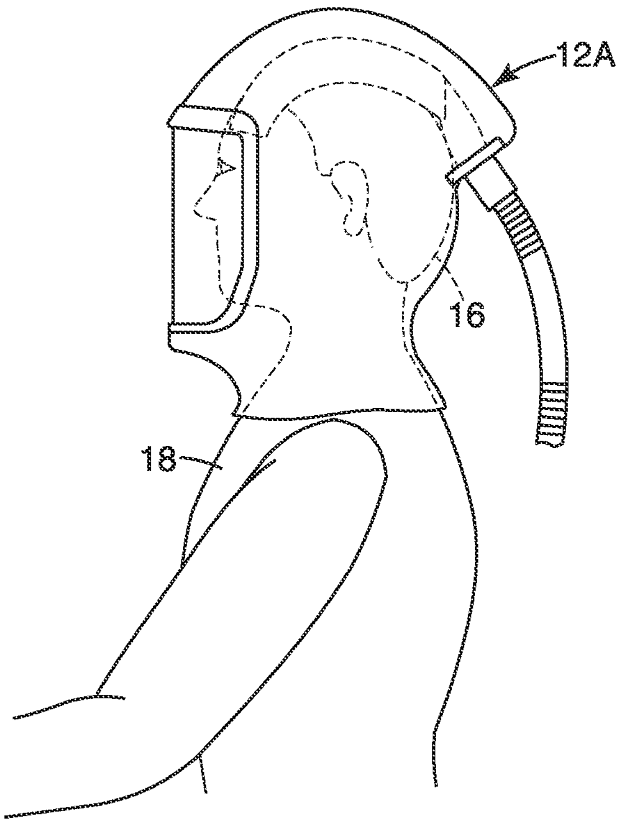
FIG. 20 is a side elevation of a respirator assembly with a respirator hood covering the entire head of a user.
Figure 21:
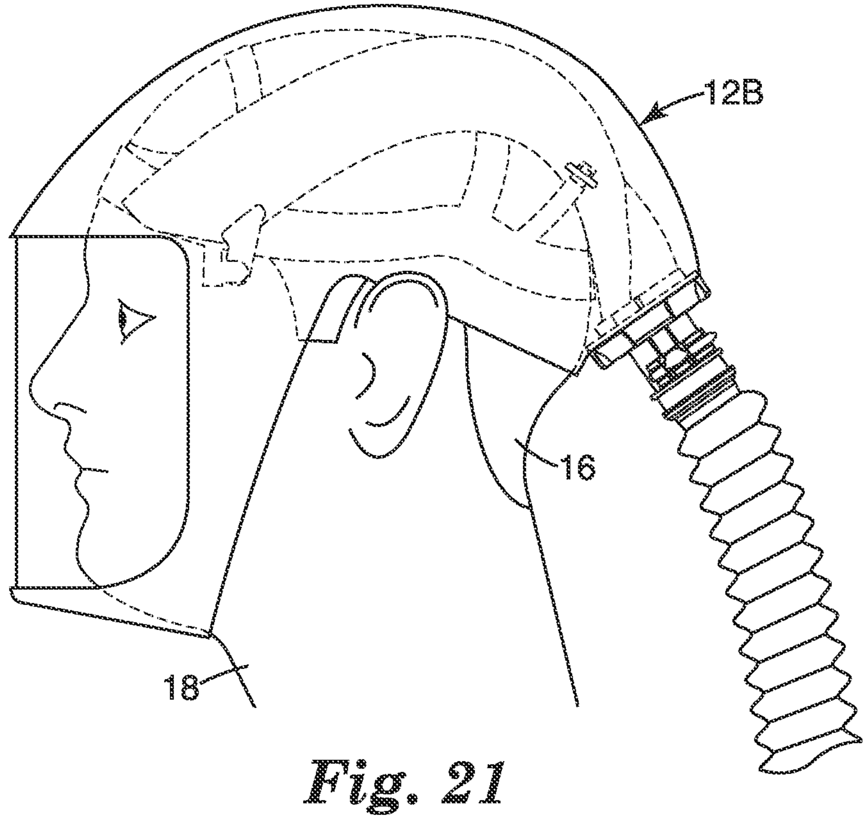
FIG. 21 is a side elevation of a respirator assembly with a head cover style respirator hood that only partially covers the head of a user.
Figure 22:
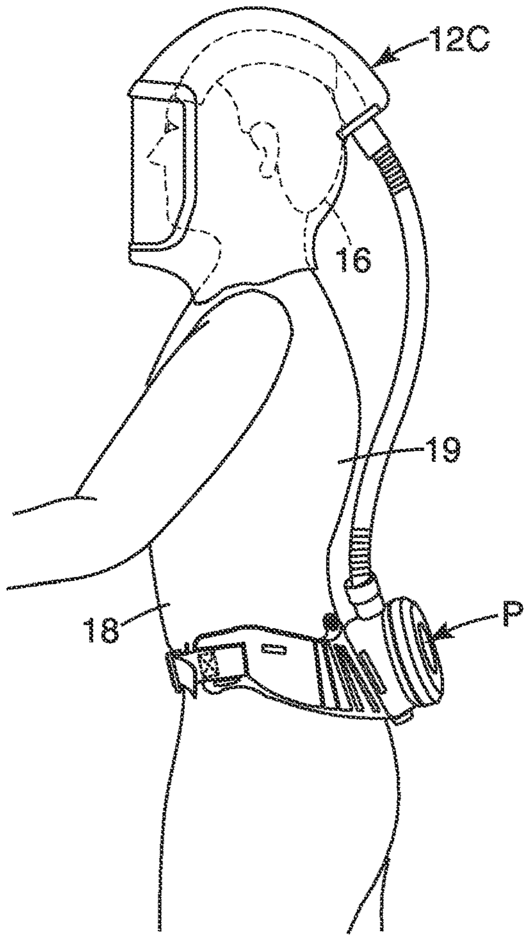
FIG. 22 is a side elevation of a respirator assembly with a respirator hood that entirely covers the head of the user and is used in combination with a full protective body suit worn by the user.

As noted above, the respirator assembly includes a hood. An exemplary hood is illustrated in FIG. 1. FIGS. 20-22 further illustrate exemplary hoods which may be used in connection with the respirator assembly of the present disclosure. FIG. 20 illustrates a hood 12A that is sized to cover the entire head 16 of a user 18, with an apron at its bottom end, adjacent the user's shoulders. FIG. 21 illustrates an alternative hood 12B, which is sometimes referred to as a head cover, wherein the hood 12B covers only a top and front portion of the head 16 of a user 18, leaving the user's ears, neck and shoulders uncovered. The hood 12B seals about the user's head at its lower edges. FIG. 22 illustrates a hood 12C that entirely covers the head 16 of a user 18, but that is also used in combination with a full protective body suit 19 worn by a user 18. Each of the hoods 12A, 12B and 12B may be non-shape stable and incorporates a shape stable manifold such as disclosed herein within the shell of the respective hood. In the embodiment disclosed in FIG. 22, the manifold is coupled to a PAPR air and/or power supply P that is carried on a belt worn by a user 18.

Other alternative hood configurations are possible, and no matter what the configuration of the non-shape stable hood that defines the shell for respiration purposes, a shape stable manifold is included within that hood (such as the exemplary manifolds disclosed herein). The manifold typically receives air from a single air inlet, and distributes air to multiple air outlets within the hood, via multiple conduits therein. The manifold may be removable from the hood, thus allowing disposal of a soiled hood and reuse of the manifold. In addition, a head harness may be provided to mount the manifold and hood to the head of the user. The head harness likewise may be removable from the hood for reuse, and may also be removable from the manifold.

In the embodiments of the respirator assembly discussed above, the shell has been disclosed as a hood, such as a non-shape stable hood. The manifold disclosed is also operable within a helmet, which may have a shape stable shell. In that instance, the helmet comprises a shell but that shell would be (at least in part) impact resistant to some degree. The air delivery conduits of the manifold are within the shell of the helmet, and likewise moveable members of a valve structure are within one or more such conduits to provide air flow control within the manifold. The amount of flow control through different portions of the manifold is controlled by user manipulation of a valve actuator outside of the helmet's shell and adjacent thereto. For instance, the user controls air flow by movement of the actuator tabs disclosed above (which are disposed about the air inlet conduit for a manifold and adjacent a back side of a user's head, where the air is supplied to the respirator assembly).

Figure 23:
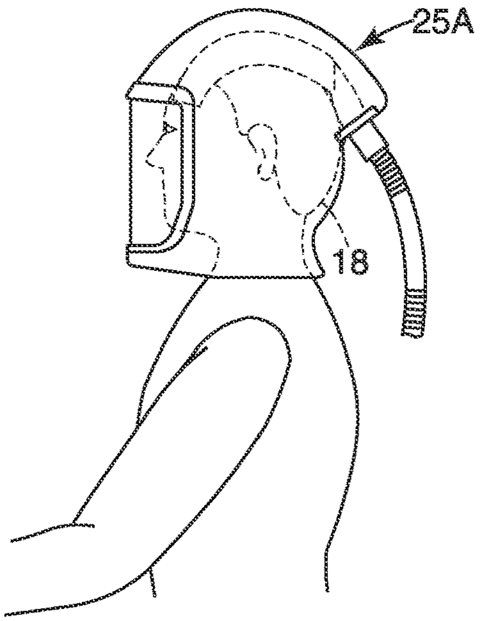
FIG. 23 is a side elevation of a respirator assembly with a hard shell helmet covering the entire head of a user.
Figure 24:
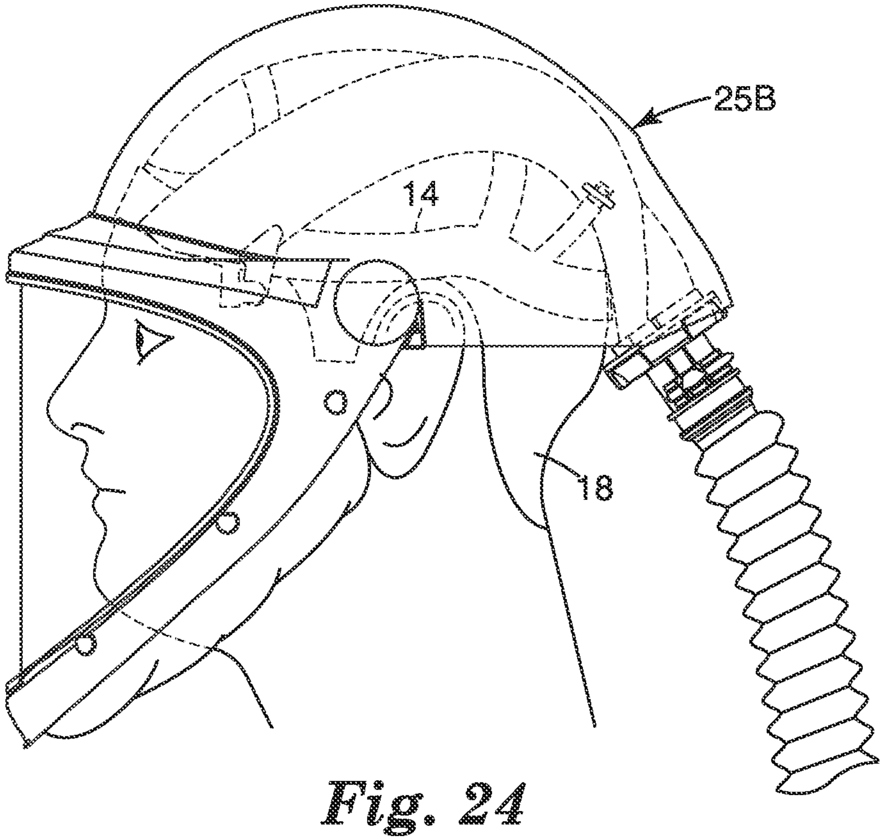
FIG. 24 is a side elevation of a respirator assembly with a hard shell helmet covering the top and facial area of the head of a user.
Figure 25:
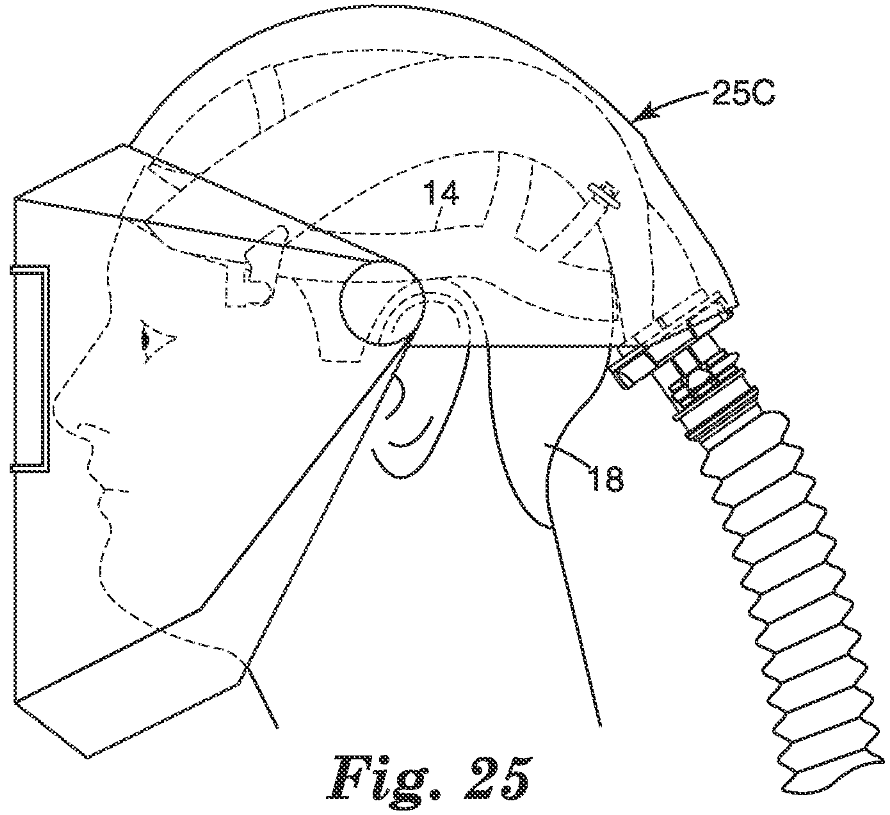
FIG. 25 is a side elevation of a respirator assembly with a hard shell helmet covering the top and facial area of the head of a user, in the general form of a welding mask.

Exemplary helmets for use in a respirator assembly are illustrated in FIGS. 23-25. FIG. 23 illustrates a respirator assembly having a helmet 25A that, once positioned on the head 16 of a user 18, covers the entire head. FIG. 24 illustrates a helmet 25B that is sized to cover only the top of a user's head 16 along with the facial area thereof. FIG. 25 illustrates a helmet 25C that also covers at least the top of a user's head 16 and the facial area thereof. Helmet 25C is configured in the general form of a welding helmet.

In these exemplary illustrations, the helmet (such as helmets 25A, 25B or 25C) is rigid, has an at least partially hard shell and provides a breathable air zone for a user. Air is provided to that breathable air zone via the type of manifold disclosed herein, and the amount of air flow to the user's facial area and cooling air within the shell of the respective helmet is likewise controlled by the valve of that manifold. As noted above, the valve is manipulatable by a user while the user wears the respirator assembly and its helmet. The manifold may be fixed to the helmet, or may be removable therefrom. Likewise, a head harness (such as the exemplary head harness 14 shown in FIGS. 24 and 25) is provided to fit the respirator assembly to the head of a user, and to support the helmet and manifold. The harness 14 may be removable from the helmet and/or manifold.

Figure 26:
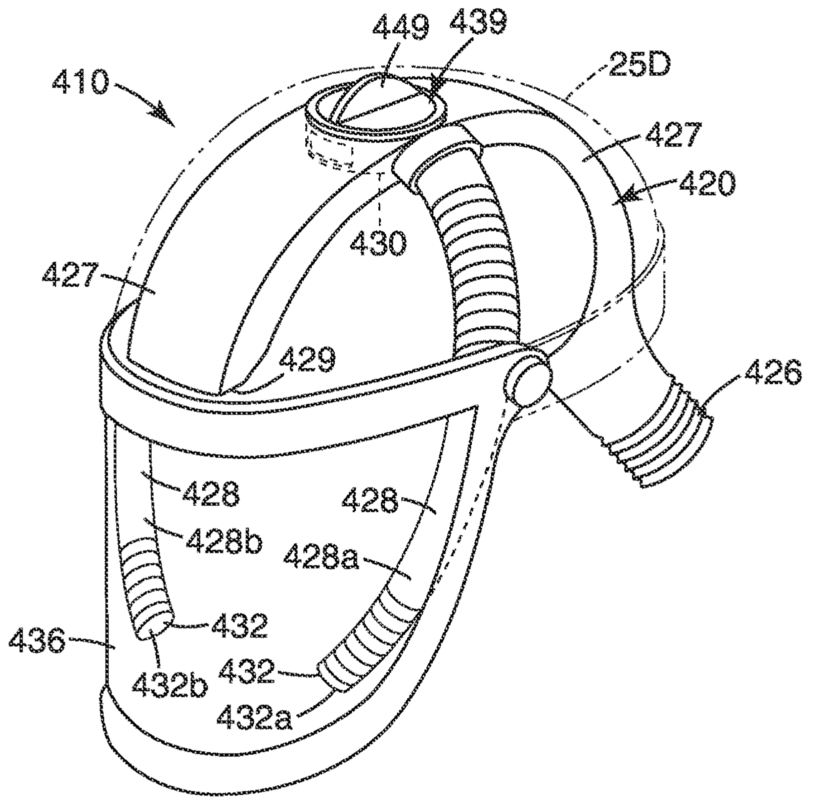
FIG. 26 is a perspective view of a respirator assembly with a hard shell hood shown in phantom.
Figure 27:
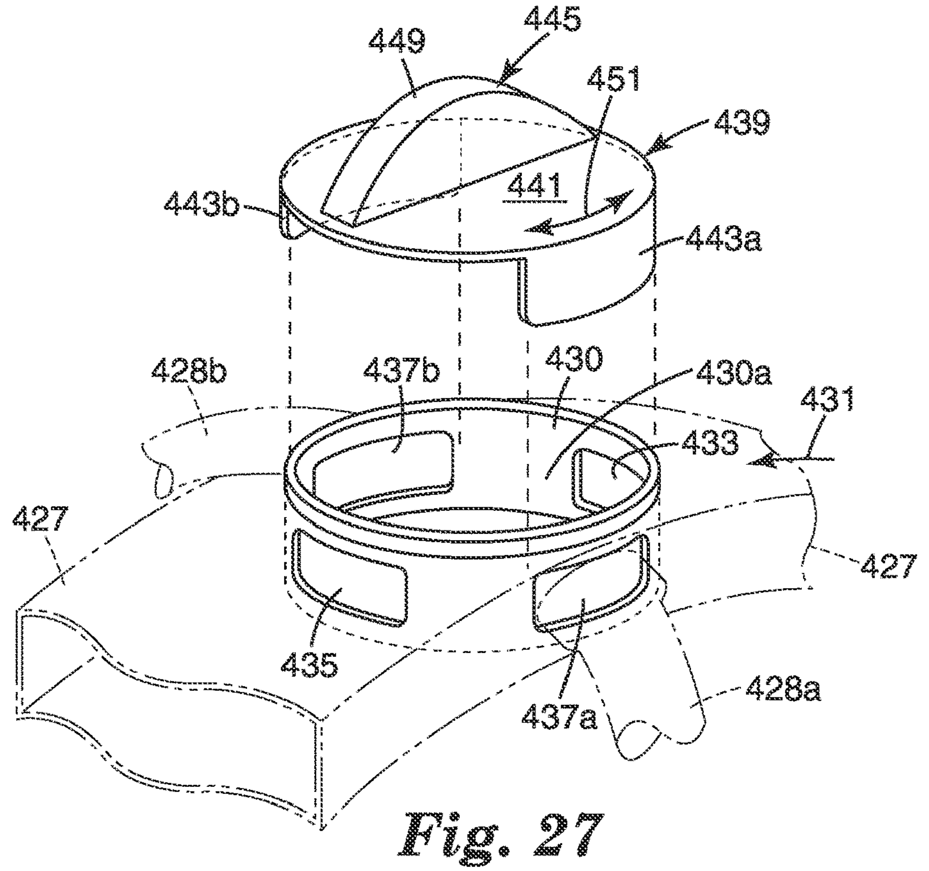
FIG. 27 is an enlarged exploded view of a portion of the manifold of the respirator assembly of FIG. 26.

An alternative embodiment for the manifold for a respirator assembly 410 is disclosed in FIGS. 26-27. In this instance, the respirator assembly 410 includes a shape stable helmet 25D that serves as a shell for the respirator assembly and that, for clarity of illustration in FIG. 26, is shown by phantom lines. Although not shown in FIG. 26, the respirator assembly 410 further includes a head harness that is adjustable in one or more dimensions so that it may be sized to conform to a head of a user. The helmet 25D is sized to extend over at least the top of the head of a user, and includes a shape stable visor 436 on a front side thereof which extends over and about the facial area of the user.

The respirator assembly further comprises a shape stable manifold 420. The manifold 420 may be separable from the head harness, and may also be separable from the helmet 25D.

The manifold 420 has an air inlet conduit 426 and a plurality of air delivery conduits 427 and 428. In one embodiment, the air inlet conduit 426 is disposed adjacent a back of the user's head. The air inlet conduit 426 is in fluid communication with the air delivery conduit 427. In this instance, the air delivery conduit 427 extends forwardly over a central portion of the user's head and has an air outlet 429 above the user's facial area. The air delivery conduit 427 includes an air distribution chamber 430 therein, which in turn is in fluid communication with the air delivery conduits 428 (in FIG. 26, two air delivery conduits 428*a* and 428*b* are illustrated). In this instance, the air distribution chamber 430 is disposed adjacent the top of the helmet 25D, within the air delivery conduit 427. Each air delivery conduit 428 has an air outlet 432 (e.g., air outlet 432*a* of air delivery conduit 428*a* and air outlet 432*b* of air delivery conduit 428*b*). Each air delivery conduit 428 extends downwardly from the air distribution chamber 430 alongside the head of the user and has its respective air outlet adjacent the user's nose and mouth. While only two air delivery conduits 428 are illustrated on the manifold 420 in FIGS. 26 and 27, it is understood that any number of such conduits may be provided.

Typically, a seal is provided about the user's head to provide an enclosed space within the shell of the helmet 25D for containing breathable air. In some instances, the seal may not be complete to allow for exhalation air to escape, or exhalation valves may be provided. The air inlet conduit 426 is in fluid communication with a supply of breathable air, in the same general manner as disclosed with respect to hose 40 and supply 42 of breathable air in relation to the embodiment of FIG. 1. Air from the air supply flows into the air inlet conduit 426 of the manifold 420, then flows through the air delivery conduit 427 and, depending upon the position of a valve, into the air delivery conduits 428. Air flows out of the air delivery conduit 427 at its air outlet 429 and out of the air delivery conduits 428 at their air outlets 432. From the air outlets 429 and 432, air flows into a breathable air zone defined by the shell of the helmet about the head of a user, for inhalation by the user.

This exemplary embodiment illustrates that the valve (and its valve actuator) for the air delivery conduit within a shell may have alternative positions and structures from those disclosed in the above embodiments. In this instance, as best seen in FIG. 27, the valve includes the air distribution chamber 430 within the air delivery conduit 427, which itself is defined in part by a cylindrical wall 430*a*.

Air flowing into the air delivery conduit 427 (as indicated by arrow 431 in FIG. 27) enters the air distribution chamber 430 via an air inlet 433. Air may exit the air distribution chamber 430 through one or more of three air outlets, forward air outlet 435, or side air outlets 437*a* and 437*b*. Air flowing through the air outlet 435 continues flowing within the air delivery conduit 427 to its air outlet 429. Air flowing through the air outlet 437*a* flows into the air delivery conduit 428*a* and to its air outlet 432*a*. Air flowing through the air outlet 437*b* flows into the air delivery conduit 428*b* and to its air outlet 432*b*.

A valve 439 controls the flow of air with respect to the air outlets 435, 437*a* and 437*b*. The valve 439 has a circular cover 441 which is sized to sealably cover the open top of the cylindrical wall 430*a* of the air distribution chamber 430. Two arcuate valve blades 443*a* and 443*b* (i.e., valve members) depend downwardly from the cover 441. The blades 443*a* and 443*b* are sized to completely cover (e.g., from the inside) the outlets 437*a* and 437*b*, respectively, when the valve 439 is aligned as illustrated in FIG. 27 and assembled with the air distribution chamber 430. The cover 441 is sealably coupled to the wall 430*a* of the air distribution chamber 430 so that air entering the air distribution chamber 430 from the air inlet 433 can only exit therefrom out of the air outlet 435. The cover 441 of the rotatable valve 439 is rotatable in a first direction, for example, in a clockwise manner (as seen in FIG. 27), to move the valve blades 443*a* and 443*b* to uncover or partially uncover the air outlets 437*a* and 437*b*, respectively. Thus, manipulation of the valve 439 results in diversion of some of the air flowing through the manifold 420 into the air delivery conduits 428*a* and 428*b*. The cover 441 is likewise rotatable in a second direction, for example in a counterclockwise manner, to cover the air outlets 437*a* and 437*b* with the valve blades 443*a* and 443*b*, respectively. The cover 441 is prevented by stops (not shown) from rotating in either direction to a position whereby the valve blades 443*a* or 443*b* obstruct the air inlet 433.

While the valve 439 is disposed essentially within the air delivery conduit 427, a valve actuator 445 for the valve is exposed exteriorly of the shell of the helmet 25D. In the illustrated embodiment, the actuator 445 has a tab 449 that can be grasped and turned by the user to vary the air flow relation between the air outlets 429, 432*a* and 432*b* within the respirator assembly. The actuator 445 and its tab 449 are rotatably mounted relative to the shell of the helmet 25D so that exterior manipulation is permitted to operate the valve members (e.g., valve blades 443*a* and 443*b*) within the shell, yet sealed relative to the shell of the helmet 25D so that the breathable air zone therein is not compromised. Detents may be provided within the structure of the valve to indicate various degrees of rotation of the valve blades relative to the air outlets.

Although the manifolds disclosed herein have been described with respect to several embodiments, workers skilled in the art will recognize that changes may be made in form and detail without departing from the spirit and scope of the respirator assembly disclosure. For instance, in some embodiments, the exemplary manifolds each have two symmetrically aligned air delivery conduits. However, it may not be essential in all cases that the conduit arrangement be symmetrical, and an asymmetrical arrangement may be desired for particular respirator assembly applications. In addition, while the illustrated embodiments disclose shape stable manifolds, it may be sufficient for the manifold to be shape stable merely adjacent the valve member of the valve, and thus have portions thereof that are non-shape stable. The valves illustrated are intended to be exemplary only, and other valve types are contemplated such as, for example, flowing type valves, pin valves, plug valves, diaphragm valves and spool valves. Furthermore, the air outlets for some of the illustrated manifolds have been disclosed as generally above and to the side of a user's eye. Alternative locations for the air outlets are also contemplated (such as seen in the manifold of FIG. 27), and the present disclosure should not be so limited by such exemplary features. In respirator assemblies where the hood defines the shell, the shell may be formed from, for example, such materials as fabrics, papers, polymers (e.g., woven materials, non-woven materials, spunbond materials (e.g., polypropylenes or polyethylenes) or knitted substrates coated with polyurethane or PVC) or combinations thereof. In alternative embodiments where the shell is a portion of a helmet, portions of the shell may be formed from, for example, such materials as polymers (e.g., ABS, nylon, polycarbonates or polyamides or blends thereof), carbon fibers in a suitable resin, glass fibers in a suitable resin or combinations thereof.

Figure 28:
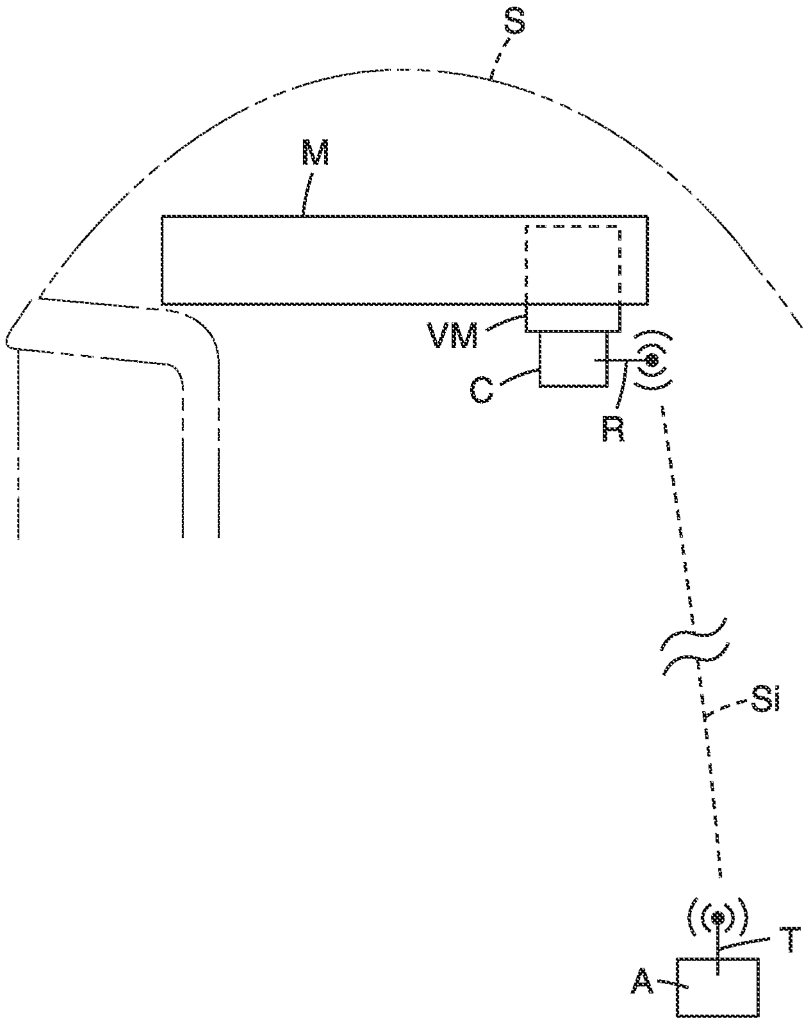
FIG. 28 is a schematic illustration of an alternative valve control configuration.

In addition, the valve actuators disclosed are all mechanical in nature (using either rotary of linear motion). Alternatively, an electromechanical device may be used to actuate the valve member of the valve. Such an embodiment is illustrated in FIG. 28, where a shell S of a respirator assembly has a manifold M therein. In this exemplary embodiment, a valve member VM and at least a portion of a controller C therefore reside within the shell S of the respirator assembly. The controller C, such as a solenoid, linear drive, or servo motor, moves the valve member VM, in response to a remote signal Si invoked by the user manipulating an actuator A outside of the shell S. The signal Si may be delivered either through cables, wired connections or radio "wireless" communication. A wireless-controlled valve member VM in such an application would employ a radio receiver R for receiving control signals Si transmitted from a user-operated transmitter T associated the actuator A. Thus, the controller C is within the shell S and causes movement of the valve member VM in response to the signal Si generated by the valve actuator A outside of the shell S. As discussed above, the valve member may operate between two states, or may open and close progressively. The valve actuator A for the controller C may be conveniently located for user access and activation on the respirator assembly, on a PAPR blower controller, or incorporated into a separate handheld transmitter. With electronic interface of the controller, it is thus be possible to incorporate feedback loops into the valve flow control process. As an example, a temperature sensor within the shell could work cooperatively with the controller to direct more or less airflow to a target zone within the shell. Electromechanical valve actuation also lends itself to distributive control of the airflow. In distributive control, multiple valve members/controllers could be controlled to manipulate airflow to different zones within the respirator shell to better balance the airflow within the respirator shell.

What is claimed is:

1. An air flow control system for a respirator, the air flow control system comprising:

a shell defining a breathable air zone for a user;

a manifold comprising an air flow plenum within the shell of the respirator and having an air flow inlet extending through an air inlet opening of the shell, the manifold being separable from the shell;

wherein the manifold comprises an air distribution chamber to receive air flow from the air flow inlet and a plurality of air delivery conduits each extending from the air distribution chamber to an air outlet within the shell of the respirator, and each of the plurality of air delivery conduits receives air flow from the air distribution chamber and has a separate air flow outlet;

wherein, when worn on the user's head, the air flow inlet and the air distribution chamber are disposed adjacent the back of the user's head, the plurality of air delivery conduits each extend forwardly from the air distribution chamber, and the air outlets are adjacent a facial area of the head of the user.

2. The air flow control system of claim 1, wherein the plurality of air delivery conduits comprises a first air delivery conduit and a second air delivery conduit, and wherein an amount of air flow through the first air delivery conduit defines an amount of air flow through at least the second air delivery conduit.

3. The air flow control system of claim 1, wherein the manifold is shape stable.

4. The air flow control system of claim 3, wherein the shell of the respirator is non-shape stable.

5. The air flow control system of claim 1, wherein the plurality of air delivery conduits curve and split such that the plurality of air delivery conduits comprise at least two upper air delivery conduits extending generally over a respective side of the user's head.

6. The air flow control system of claim 1, wherein a seal is formed between the shell and the air flow inlet at the air inlet opening.

7. The air flow control system of claim 1, wherein the shell comprises a front side that includes a visor and a back side that includes the air inlet opening.

8. The air flow control system of claim 1, comprising a head harness within the shell for engaging the head of the user to support the manifold and shell thereon.

9. The air flow control system of claim 1, wherein the air delivery conduits of the manifold are symmetrically disposed relative to the air distribution chamber.

10. The air flow control system of claim 1, wherein the manifold comprises a juncture area where the two air delivery conduits split from the air distribution chamber, and the juncture area comprises an opening.

11. The air flow control system of claim 10, wherein the manifold comprises a valve member to selectively open and close the opening.

* * * * *